(12) United States Patent
Ozawa

(10) Patent No.: US 9,489,160 B2
(45) Date of Patent: Nov. 8, 2016

(54) IMAGE PROCESSING APPARATUS

(71) Applicant: RISO KAGAKU CORPORATION, Minato-ku, Tokyo (JP)

(72) Inventor: Masaki Ozawa, Tsukuba (JP)

(73) Assignee: RISO KAGAKU CORPORATION, Tokyo (JP)

( * ) Notice: Subject to any disclaimer, the term of this patent is extended or adjusted under 35 U.S.C. 154(b) by 0 days.

(21) Appl. No.: 14/743,630

(22) Filed: Jun. 18, 2015

(65) Prior Publication Data

US 2015/0378655 A1    Dec. 31, 2015

(30) Foreign Application Priority Data

Jun. 27, 2014   (JP) .................. 2014-132534

(51) Int. Cl.
  *G06F 15/00*   (2006.01)
  *G06F 3/12*    (2006.01)
  *G06K 15/02*   (2006.01)

(52) U.S. Cl.
  CPC ......... *G06F 3/1243* (2013.01); *G06K 15/1822* (2013.01); *G06F 3/122* (2013.01); *G06F 3/1219* (2013.01); *G06F 3/1244* (2013.01); *G06F 3/1285* (2013.01); *G06K 15/1825* (2013.01)

(58) Field of Classification Search
  None
  See application file for complete search history.

(56) References Cited

U.S. PATENT DOCUMENTS

| 8,270,025 | B2 * | 9/2012 | Xu | H04N 1/00681 |
| | | | | 358/1.14 |
| 8,654,411 | B2 * | 2/2014 | Oshima | H04N 1/00204 |
| | | | | 358/1.13 |
| 8,665,497 | B2 * | 3/2014 | Muraishi | G06T 7/40 |
| | | | | 358/3.15 |
| 2001/0039552 | A1 * | 11/2001 | Killi | G06F 9/4446 |
| | | | | 715/234 |
| 2003/0235451 | A1 * | 12/2003 | Brown | B41J 11/46 |
| | | | | 400/76 |
| 2005/0134871 | A1 * | 6/2005 | Nakagiri | H04N 1/203 |
| | | | | 358/1.6 |
| 2008/0091636 | A1 * | 4/2008 | Ferlitsch | H04N 1/00002 |
| 2009/0190146 | A1 * | 7/2009 | Xu | H04N 1/00681 |
| | | | | 358/1.9 |
| 2010/0002259 | A1 * | 1/2010 | Maruyama | H04N 1/00411 |
| | | | | 358/1.15 |
| 2011/0194135 | A1 * | 8/2011 | Hamilton | G06F 3/1208 |
| | | | | 358/1.14 |
| 2012/0154853 | A1 * | 6/2012 | Otake | H04N 1/41 |
| | | | | 358/1.15 |
| 2014/0320934 | A1 * | 10/2014 | Muraishi | H04N 1/4074 |
| | | | | 358/453 |

FOREIGN PATENT DOCUMENTS

JP    03270952 A  * 12/1991
JP    2004074783 A   3/2004

* cited by examiner

*Primary Examiner* — Dung Tran
(74) *Attorney, Agent, or Firm* — Holtz, Holtz & Volek PC

(57) ABSTRACT

Provided are: an identifying process unit that calculates a product set of rendering instructions for objects included in a processing-target page and rendering instructions for objects included in a page different from the processing-target page; a blank sheet determining unit that identifies a body object and that determines whether the body object has been identified, the body object being obtained by excluding the objects corresponding to the rendering instructions included in the product set from objects included in the processing-target page; and a RIP processing unit that generates raster data after excluding a page for which a determination has been made that the body object has not been identified.

6 Claims, 20 Drawing Sheets

| PAGE NUMBER | PROCESSING-TARGET FLAG | BLANK FLAG |
|---|---|---|
| 1 | 1 | 0 |
| 2 | 1 | 0 |
| 3 | 1 | 1 |
| 4 | 1 | 0 |
| 5 | 1 | 1 |
| 6 | 1 | 0 |

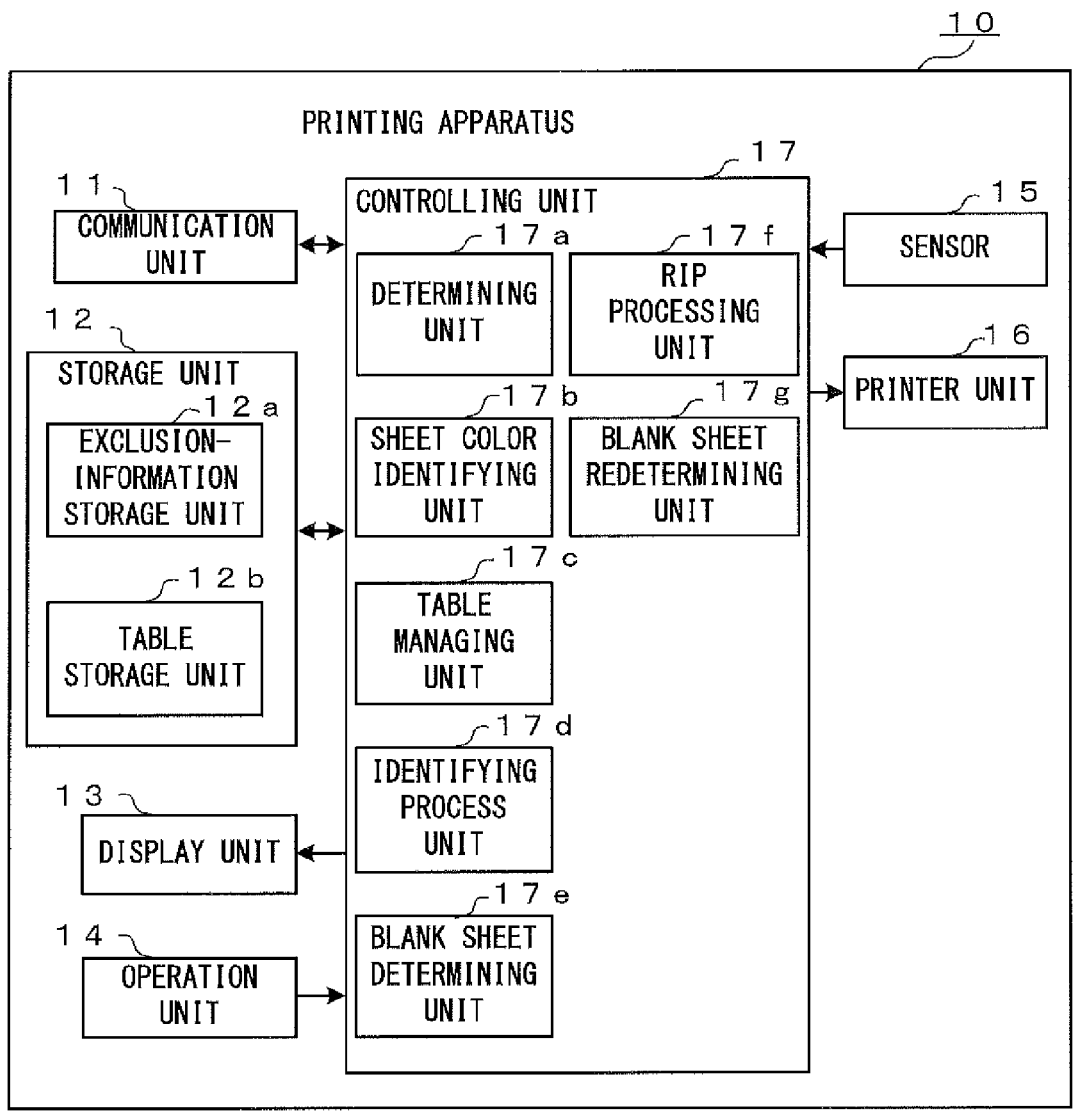
F I G. 6

| PAGE NUMBER | EXCLUSION-INFORMATION IDENTIFIER |
|---|---|
| 1 | — |
| 2 | — |
| 3 | E X 1 |
| 4 | — |
| 5 | — |
| 6 | E X 1 |

| PAGE NUMBER | PROCESSING-TARGET FLAG | BLANK FLAG |
|---|---|---|
| 1 | 1 | 0 |
| 2 | 1 | 0 |
| 3 | 1 | 0 |
| 4 | 1 | 0 |
| 5 | 1 | 1 |
| 6 | 1 | 0 |

| PAGE NUMBER | PROCESSING-TARGET FLAG | BLANK FLAG |
|---|---|---|
| 1 | 0 | 0 |
| 2 | 0 | 0 |
| 3 | 1 | 0 |
| 4 | 1 | 0 |
| 5 | 1 | 1 |
| 6 | 1 | 0 |

| PAGE NUMBER | PROCESSING-TARGET FLAG | BLANK FLAG |
|---|---|---|
| 1 | 1 | 0 |
| 2 | 1 | 1 |
| 3 | 1 | 0 |
| 4 | 1 | 0 |
| 5 | 1 | 1 |
| 6 | 1 | 0 |

FIG. 16A

| PAGE NUMBER | PROCESSING-TARGET FLAG | BLANK FLAG |
|---|---|---|
| 1 | 1 | 0 |
| 2 | 1 | 0 |
| 3 | 1 | 1 |
| 4 | 1 | 0 |
| 5 | 1 | 1 |
| 6 | 1 | 0 |

FIG. 16B

| PAGE NUMBER | PROCESSING-TARGET FLAG | BLANK FLAG |
|---|---|---|
| 1 | 1 | 0 |
| 2 | 1 | 0 |
| 3 | 0 | 0 |
| 4 | 1 | 0 |
| 5 | 0 | 0 |
| 6 | 1 | 0 |

FIG. 16C

| PAGE NUMBER | PROCESSING-TARGET FLAG | BLANK FLAG |
|---|---|---|
| 1 | 1 | 0 |
| 2 | 1 | 0 |
| 3 | 1 | 0 |
| 4 | 1 | 0 |
| 5 | 1 | 1 |
| 6 | 1 | 0 |

IMAGE PROCESSING APPARATUS

CROSS-REFERENCE TO RELATED APPLICATION

This application is based upon and claims the benefit of priority of the prior Japanese Patent Application No. 2014-132534, filed on Jun. 27, 2014, the entire contents of which are incorporated herein by reference.

BACKGROUND OF THE INVENTION

1. Field of the Invention

The present invention relates to an image processing apparatus.

2. Description of the Related Art

Conventionally, when a document includes blank pages, a printing process has been performed unnecessarily on the blank pages as well, leading to waste in print sheets and processing time.

To solve this problem, a technique has been proposed for performing a printing process in which blank pages are excluded (e.g., Japanese Laid-open Patent Publication No. 2004-74783). In a method proposed by Japanese Laid-open Patent Publication No. 2004-74783, a determination is made as to whether a processing-target page is blank according to whether a pixel is recorded in a designated region on the page.

SUMMARY OF THE INVENTION

However, in the method proposed by Japanese Laid-open Patent Publication No. 2004-74783, to exclude forms that include a header and/or a footer from the targets of the blank sheet determination, regions need to be designated for which the blank sheet determination is to be performed, causing inconvenience. For example, in variable printing, forms could be vastly different between pages, and it would be very troublesome to designate for each page a region for which the blank sheet determination is to be made.

In view of the problem above, an object of the present invention is to provide an image processing apparatus that is capable of making a blank sheet determination in consideration of a form that includes a header and/or a footer without designating a region for which the blank sheet determination is to be made.

An image processing apparatus in accordance with a first invention is an image processing apparatus that processes a processing-target document on a page-by-page basis, the image processing apparatus including: a calculating unit that calculates a product set of rendering instructions for objects included in a processing-target page and rendering instructions for objects included in a page different from the processing-target page; an identifying unit that identifies a body object, the body object being obtained by excluding the objects corresponding to the rendering instructions included in the product set from objects included in the processing-target page; a determining unit that determines whether the body object has been identified; and a processing unit that generates raster data after excluding a page for which a determination has been made that the body object has not been identified.

A form that includes a header and/or a footer is, in many cases, identical with another page, and hence a rendering instruction for an object belonging to the form is highly likely to be included in the product set of rendering instructions for the form and rendering instructions for that another page. According to the product set, the image processing apparatus in accordance with the first invention is capable of identifying body objects that do not include objects belonging to a form. This enables a blank sheet determination to be made in consideration of a form without designating a region for which the blank sheet determination is to be performed, thereby improving the operability.

BRIEF DESCRIPTION OF DRAWINGS

FIG. 2 illustrates an exemplary configuration of a page management table in accordance with embodiment 1.

FIG. 6 is a functional block diagram illustrating an exemplary configuration of a printing apparatus that constitutes a printing system in accordance with embodiment 2.

FIG. 7 illustrates an exemplary configuration of an exclusion-information management table in accordance with embodiment 2.

FIG. 12A illustrates the state of a page management table at a point in processing time, the state corresponding to the concrete example in FIG. 11.

FIG. 12B illustrates the state of a page management table at a point in processing time, the state corresponding to the concrete example in FIG. 11.

FIG. 12C illustrates the state of a page management table at a point in processing time, the state corresponding to the concrete example in FIG. 11.

FIG. 16A illustrates the state of a page management table at a point in processing time, the state corresponding to the concrete example in FIG. 15.

FIG. 16B illustrates the state of a page management table at a point in processing time, the state corresponding to the concrete example in FIG. 15.

FIG. 16C illustrates the state of a page management table at a point in processing time, the state corresponding to the concrete example in FIG. 15.

DETAILED DESCRIPTION OF THE PREFERRED EMBODIMENTS

The following will describe embodiments of the present invention in detail with reference to the drawings.

<Embodiment 1>

Figure 1:
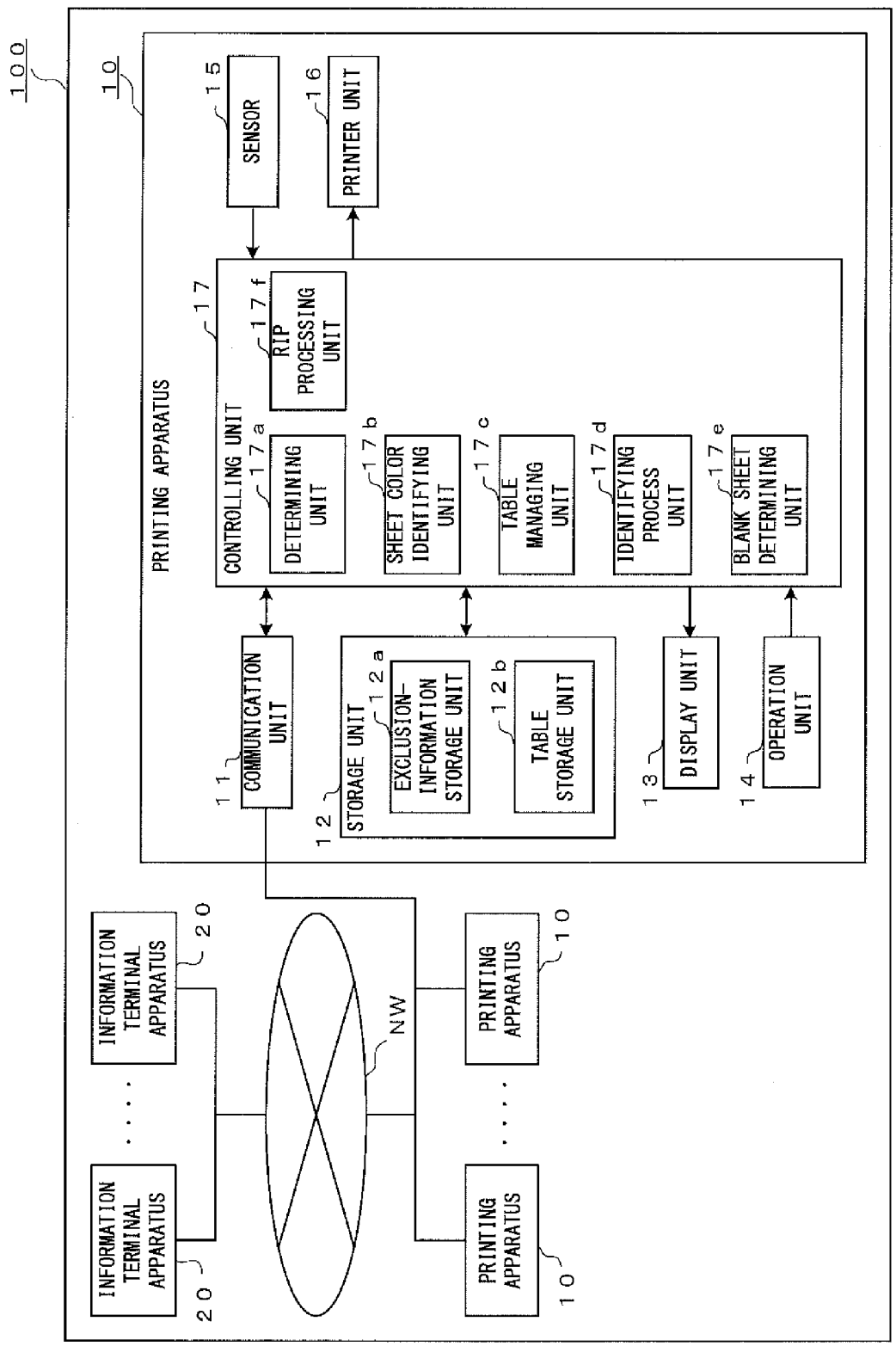
FIG. 1 is a functional block diagram illustrating an exemplary configuration of a printing system in accordance with embodiment 1, and an exemplary configuration of a printing apparatus that constitutes the printing system.

FIG. 1 is a functional block diagram illustrating an exemplary configuration of a printing system 100 in accordance with embodiment 1, and an exemplary configuration of a printing apparatus 10 that constitutes the printing system 100. As depicted in FIG. 1, the printing system 100 includes one or more printing apparatuses 10, i.e., image processing apparatuses, and one or more information terminal apparatuses 20 that output a print job in accordance with an instruction from a user. The printing apparatuses 10 and the information terminal apparatuses 20 are communicably connected to each other over a network NW.

The printing apparatus 10 in accordance with embodiment 1 processes a print job output from the information terminal apparatus 20, prints pages other than a page judged to be blank in a blank sheet determination (described in detail hereinafter) on print media such as paper, and outputs the print media. As depicted in FIG. 1, the printing apparatus 10 in accordance with embodiment 1 includes a communication unit 11, a storage unit 12, a display unit 13, an operation unit 14, a sensor 15, a printer unit 16, and a controlling unit 17.

The communication unit 11 consists of, for example, a communication module and communicates with the information terminal apparatuses 20 over the network NW. For example, the communication unit 11 may receive a print job output from the information terminal apparatus 20.

The storage unit 12 consists of, for example, a RAM (Random Access Memory), a ROM (Read Only Memory), and/or a nonvolatile memory, and functions as a work area of a CPU (Central Processing Unit) that constitutes the controlling unit 17, a program area in which are stored various programs such as an operation program for controlling the entirety of the printing apparatus 10, and/or a data area in which are stored various pieces of data such as rendering information of each page for which a blank sheet determination has been performed.

As illustrated in FIG. 1, the storage unit 12 also functions as an exclusion-information storage unit 12a and a table storage unit 12b. The exclusion-information storage unit 12a is a storage unit for storing exclusion information (described hereinafter in detail) identified by an identifying process unit 17d (described hereinafter in detail). The table storage unit 12b stores tables and, in embodiment 1, stores a page management table T1.

With reference to FIG. 2, the following will describe the page management table T1 in accordance with embodiment 1. FIG. 2 illustrates an exemplary configuration of the page management table T1 in accordance with embodiment 1.

The page management table T1 in accordance with embodiment 1 is managed by a table managing unit 17c (described hereinafter in detail), is referred to when, for example, a RIP processing unit 17f (described hereinafter in detail) performs a RIP (Raster Image Processor) process on a processing-target print job, and is configured in a manner such that, as depicted in FIG. 2, a "processing-target flag" and a "blank flag" are correlated with each other for each "page number".

The "page number" represents an order in which physical pages are arranged in processing-target document data. That is, the "page number" is different from a page number set by the user. The "processing-target flag" indicates whether a page with a corresponding page number has become a target of the blank sheet determination. In embodiment 1, flag value "0" indicates that the page has not become a processing target, and flag value "1" indicates that the page has become a processing target. Note that an initial value of the processing-target flag is "0".

The "blank flag" indicates whether a page with a corresponding page number is blank, and is set according to the blank sheet determination. In embodiment 1, flag value "0" indicates that the page is not blank, and flag value "1" indicates that the page is blank. Note that an initial value of the blank flag is "0".

Referring to FIG. 1 again, the display unit 13 consists of, for example, a display apparatus such as an LCD (Liquid Crystal Display) or an organic EL (Electro-Luminescence) display, and displays, for example, images, various messages, and various function buttons on a display screen.

The operation unit 14 consists of, for example, a ten key or a touch panel displayed on the display screen of the display unit 13. The user can cause the printing apparatus 10 to perform a desired process by operating the operation unit 14 to input an instruction to the printing apparatus 10.

The sensor 15 consists of, for example, a color sensor. The sensor 15 is located in, for example, a paper feed tray for holding print sheets to be fed, and measures the color of a held print sheet (hereinafter referred to as a sheet color) and outputs a measurement result to a sheet color identifying unit 17b (described hereinafter in detail).

The printer unit 16 consists of, for example, a printer engine. When the RIP processing unit 17f generates raster data, the printer unit 16 prints an image on a print medium according to the generated raster data and outputs the print medium.

The controlling unit 17 consists of, for example, a CPU and executes an operation program stored in a program area of the storage unit 12. This allows the controlling unit 17 to function as a determining unit 17a, the sheet color identifying unit 17b, the table managing unit 17c, the identifying process unit 17d, a blank sheet determining unit 17e, and the RIP processing unit 17f, as depicted in FIG. 1. In addition, the controlling unit 17 performs processes such as a controlling process for controlling the entirety of the printing apparatus 10 and a blank sheet determination process that will be described hereinafter in detail.

The determining unit 17a determines whether a print job has been received. The determining unit 17a also determines whether an unprocessed page is present. More particularly, the determining unit 17a searches fields of a "processing-target flag" in the page management table T1 so as to determine whether an entry with a flag value of "0" is present, thereby determining whether an unprocessed page is present. That is, when an entry is present for which a flag value of "0" is indicated by a processing-target flag, the determining unit 17a determines that an unprocessed page is present; otherwise, the determining unit 17a determines that an unprocessed page is not present.

The sheet color identifying unit 17b controls and causes the sensor 15 to measure a sheet color and to output a measurement result. The sheet color identifying unit 17b identifies the sheet color according to the measurement result output from the sensor 15.

The table managing unit 17c manages the page management table T1. More particularly, upon receipt of a print job, the table managing unit 17c initializes the page management table T1. The table managing unit 17c analyzes the received print job and registers as many entries as the number of pages of processing-target document data. When the identifying process unit 17d obtains a rendering instruction for an object included in an unprocessed page (hereinafter referred to as rendering information of a page), the table managing unit 17c sets "1" as a flag value of "processing-target flag" corresponding to the obtained page. When the blank sheet determining unit 17e judges the processing-target page to be blank, the table managing unit 17c sets "1" as a flag value of "blank flag" corresponding to the page judged to be blank.

According to a rendering instruction for each object included on pages, the identifying process unit 17d performs a process of identifying exclusion information for the processing-target page. The exclusion information indicates an object excluded from the target of the blank sheet determination; the exclusion information in embodiment 1 indicates an object corresponding to a rendering instruction included in the product set of rendering instructions for a processing-target page and for the immediately preceding page. Information indicating an object corresponding to a rendering instruction included in the product set is used as exclusion information in this way because the object corresponding to a rendering instruction included in the product set is highly likely to be an object belonging to a form, such as a header or a footer.

More particularly, the identifying process unit 17d searches fields of "processing-target flag" in the page management table T1 so as to identify a page with the smallest page number among unprocessed pages. Then, the identifying process unit 17d analyzes a received print job and obtains rendering information of the identified unprocessed page. Unless an identified unprocessed page is the initial page (page 1), the identifying process unit 17d identifies exclusion information by calculating the product set of rendering instructions for the processing-target page and for the immediately preceding page.

When the calculated product set is not an empty set and exclusion information is stored in the exclusion-information storage unit 12a, the identifying process unit 17d compares the identified exclusion information with the stored exclusion information. When the identified exclusion information is different from the stored exclusion information, the identifying process unit 17d updates the exclusion information stored in the exclusion-information storage unit 12a with the identified exclusion information. On the other hand, when the calculated product set is not an empty set and exclusion information is not stored in the exclusion-information storage unit 12a, the identifying process unit 17d stores the identified exclusion information in the exclusion-information storage unit 12a.

Figure 3:
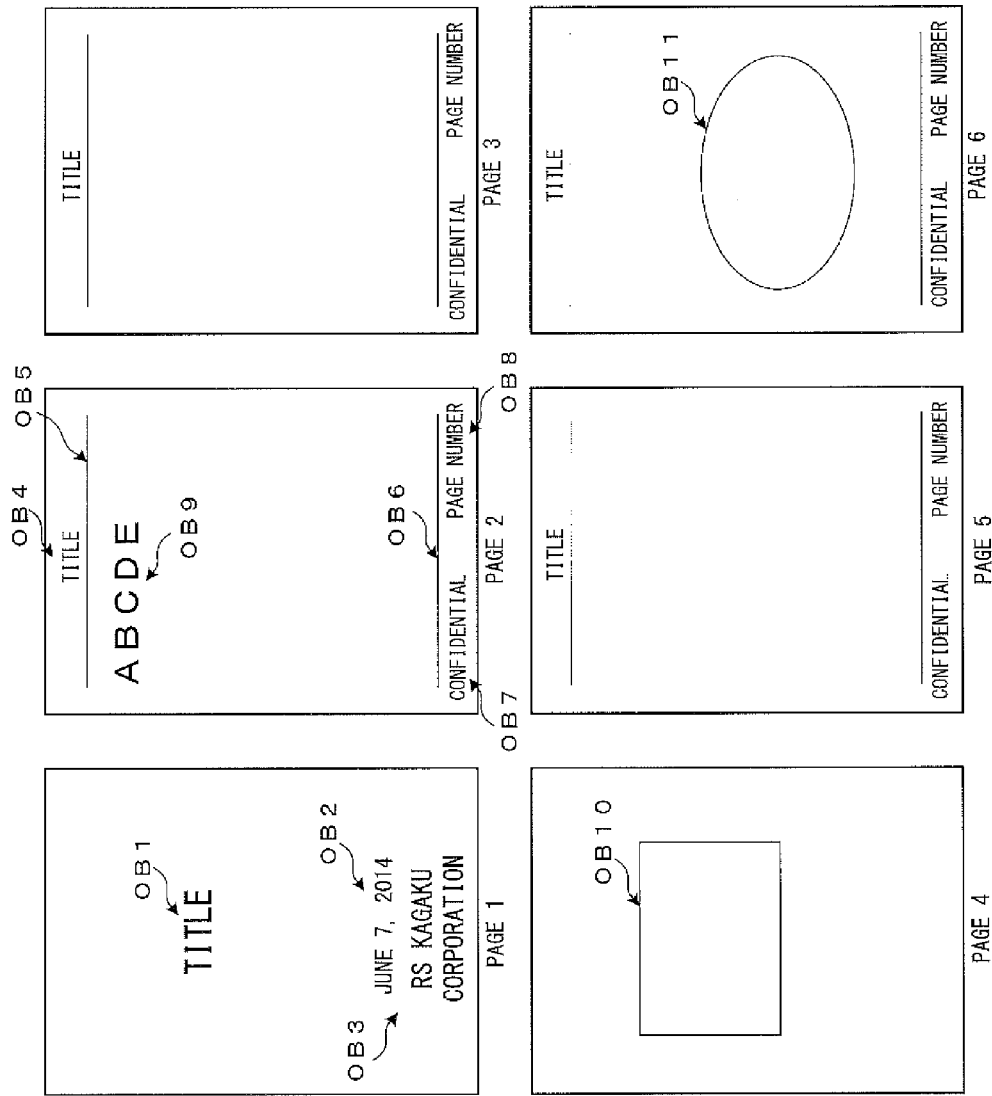
FIG. 3 illustrates a concrete example of document data that is a processing target in accordance with embodiment 1.

Assume, for example, that page 3 is a processing-target page in FIG. 3. In this case, objects included on page 2, i.e., the immediately preceding page, are objects OB4-OB9, and objects OB4-OB8 are included on page 3. In this case, accordingly, the identifying process unit 17d identifies information indicating objects OB4-OB8 as exclusion information for page 3. The product set for objects of pages 1 and 2 is, as depicted in FIG. 3, an empty set, and exclusion information is not stored in the exclusion-information storage unit 12a, with the result that the identifying process unit 17d stores the identified exclusion information in the exclusion-information storage unit 12a. Note that FIG. 3 illustrates a concrete example of document data that is a processing target in accordance with embodiment 1.

Referring to FIG. 1 again, the blank sheet determining unit 17e makes a blank sheet determination for determining whether a processing-target page is blank. More particularly, when exclusion information is stored in the exclusion-information storage unit 12a, the blank sheet determining unit 17e identifies an object obtained by excluding an object indicated by the stored exclusion information and a null character such as a newline character or a space character (hereinafter simply referred to as a null character) from objects included in the processing-target page (hereinafter referred to as a body object). When exclusion information is not stored in the exclusion-information storage unit 12a, the blank sheet determining unit 17e identifies, as a body object, an object obtained by excluding a null character from the objects included in the processing-target page. When a body object is not identified, the blank sheet determining unit 17e determines that the processing-target page is blank.

That is, in the absence of a body object, even though the processing-target page includes another object, such an object is highly likely to be a null character or an object belonging to a form, and hence the blank sheet determining unit 17e determines that the processing-target page is blank.

When a body object(s) is identified, the blank sheet determining unit 17e identifies a color of each body object according to rendering instructions for objects. The blank sheet determining unit 17e compares the identified color of each body object with a sheet color identified by the sheet color identifying unit 17b. When a body object whose color is different from the sheet color is not present, the blank sheet determining unit 17e determines that the processing-target page is blank.

That is, even when a processing-target page includes body objects, the body objects are unable to be visually recognized after the page is printed if the color of the body objects is identical with a sheet color, and hence the blank sheet determining unit 17e determines that the processing-target page is blank.

The RIP processing unit 17f refers to the page management table T1 so as to generate raster data by performing a RIP process on pages other than the pages judged to be blank. In the example of FIG. 2, the RIP processing unit 17f generates raster data of pages 1, 2, 4, and 6, for which the flag value of "blank flag" is "0", which indicates nonblank.

Figure 4:
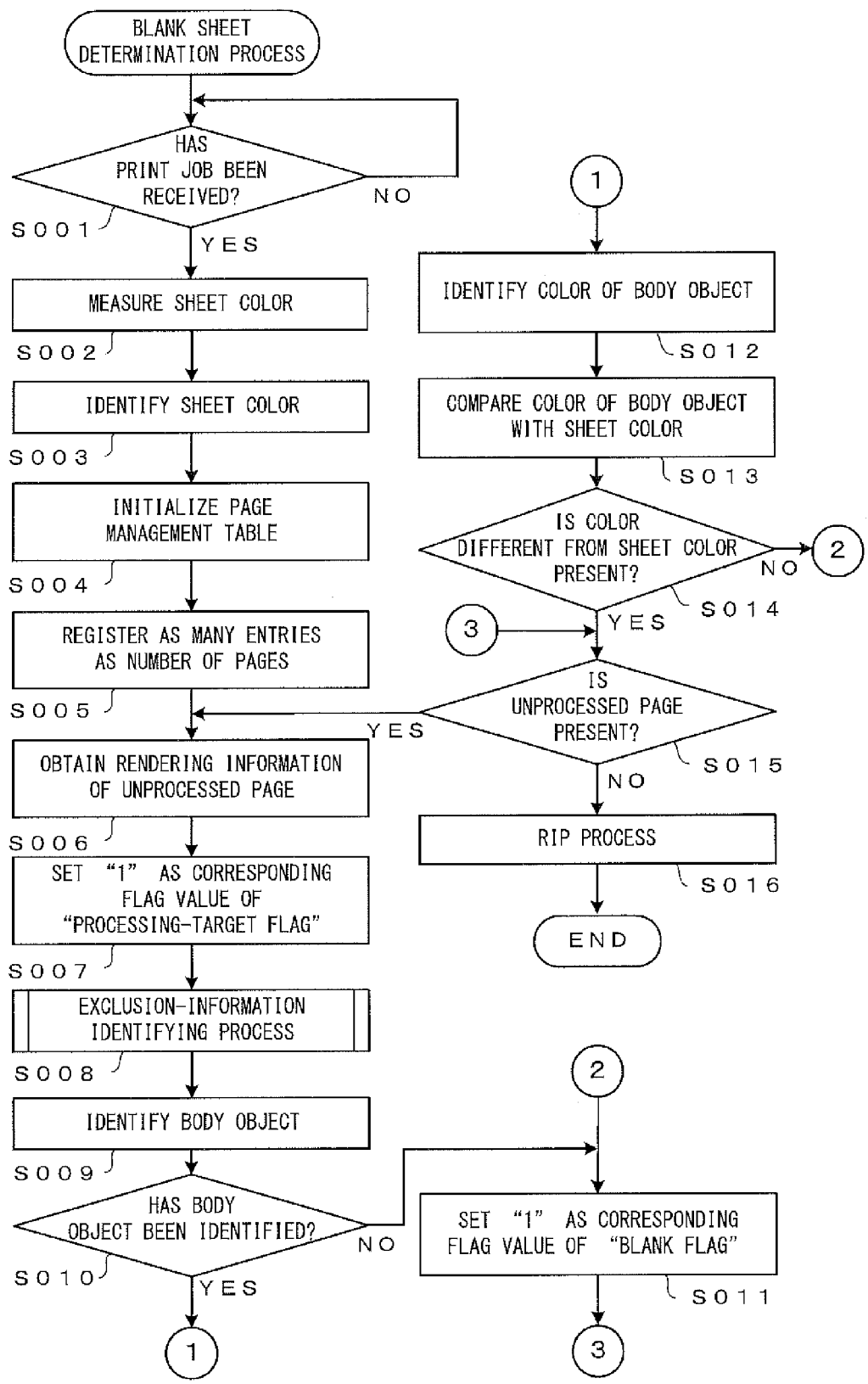
FIG. 4 is an exemplary flowchart illustrating the flow of a blank sheet determination process in accordance with embodiment 1.

With reference to FIG. 4, the following will describe the flow of a blank sheet determination process in accordance with embodiment 1. FIG. 4 is an exemplary flowchart illustrating the flow of a blank sheet determination process in accordance with embodiment 1. Reception of a print job triggers the blank sheet determination process.

The determining unit 17a determines whether a print job has been received (step S001). When the determining unit 17a determines that a print job has not been received (step S001: NO), the process of step S001 is repeated to await reception of a print job.

When the determining unit 17a determines that a print job has been received (step S001: YES), the sheet color identifying unit 17b controls and causes the sensor 15 to measure a sheet color and to output a measurement result (step S002).

The sheet color identifying unit 17*b* identifies the sheet color according to the measurement result (step S003).

The table managing unit 17*c* initializes the page management table T1 (step S004) and registers as many entries as the number of pages of processing-target document data in the page management table T1 (step S005). The identifying process unit 17*d* refers to the page management table T1 so as to identify an unprocessed page, and obtains rendering information of the identified unprocessed page (step S006).

The table managing unit 17*c* sets "1" as a corresponding flag value of "processing-target flag" in the page management table T1 (step S007). The identifying process unit 17*d* performs an exclusion-information identifying process (step S008).

The blank sheet determining unit 17*e* identifies a body object within the processing-target page according to exclusion information stored in the exclusion-information storage unit 12*a* (step S009). When exclusion information is not stored in the exclusion-information storage unit 12*a*, the blank sheet determining unit 17*e* identifies, as a body object, an object obtained by excluding a null character from the objects included in the processing-target page.

The blank sheet determining unit 17*e* determines whether a body object has been identified (step S010). When the blank sheet determining unit 17*e* determines that a body object has not been identified (step S010: NO), i.e., when the processing-target page is judged to be blank, the table managing unit 17*c* sets "1" as a corresponding flag value of "blank flag" in the page management table T1 (step S011). Then, the flow shifts to step S015, which will be described hereinafter.

When the blank sheet determining unit 17*e* determines that a body object (s) has been identified (step S010: YES), the blank sheet determining unit 17*e* identifies a color of each body object according to rendering instructions for objects (step S012). The blank sheet determining unit 17*e* compares the identified color of each body object with a sheet color identified by the sheet color identifying unit 17*b* (step S013).

The blank sheet determining unit 17*e* determines whether a body object whose color is different from the sheet color is present (step S014). When the blank sheet determining unit 17*e* determines that a body object whose color is different from the sheet color is not present (step S014: NO), i.e., when the blank sheet determining unit 17*e* determines that the processing-target page is blank, the table managing unit 17*c* sets "1" as a corresponding flag value of "blank flag" in the page management table T1 (step S011). Then, the flow shifts to step S015, which will be described hereinafter.

On the other hand, when the blank sheet determining unit 17*e* determines that a body object whose color is different from the sheet color is present (step S014: YES), the determining unit 17*a* determines whether an unprocessed page is present (step S015). When the determining unit 17*a* determines that an unprocessed page is present (step S015: YES), the flow returns to step S006, and the processes described above are repeated.

Meanwhile, when the determining unit 17*a* determines that an unprocessed page is not present (step S015: NO), the RIP processing unit 17*f* refers to the page management table T1 so as to generate raster data by performing a RIP process on pages other than the pages judged to be blank (step S016). Then, the flow ends.

Figure 5:
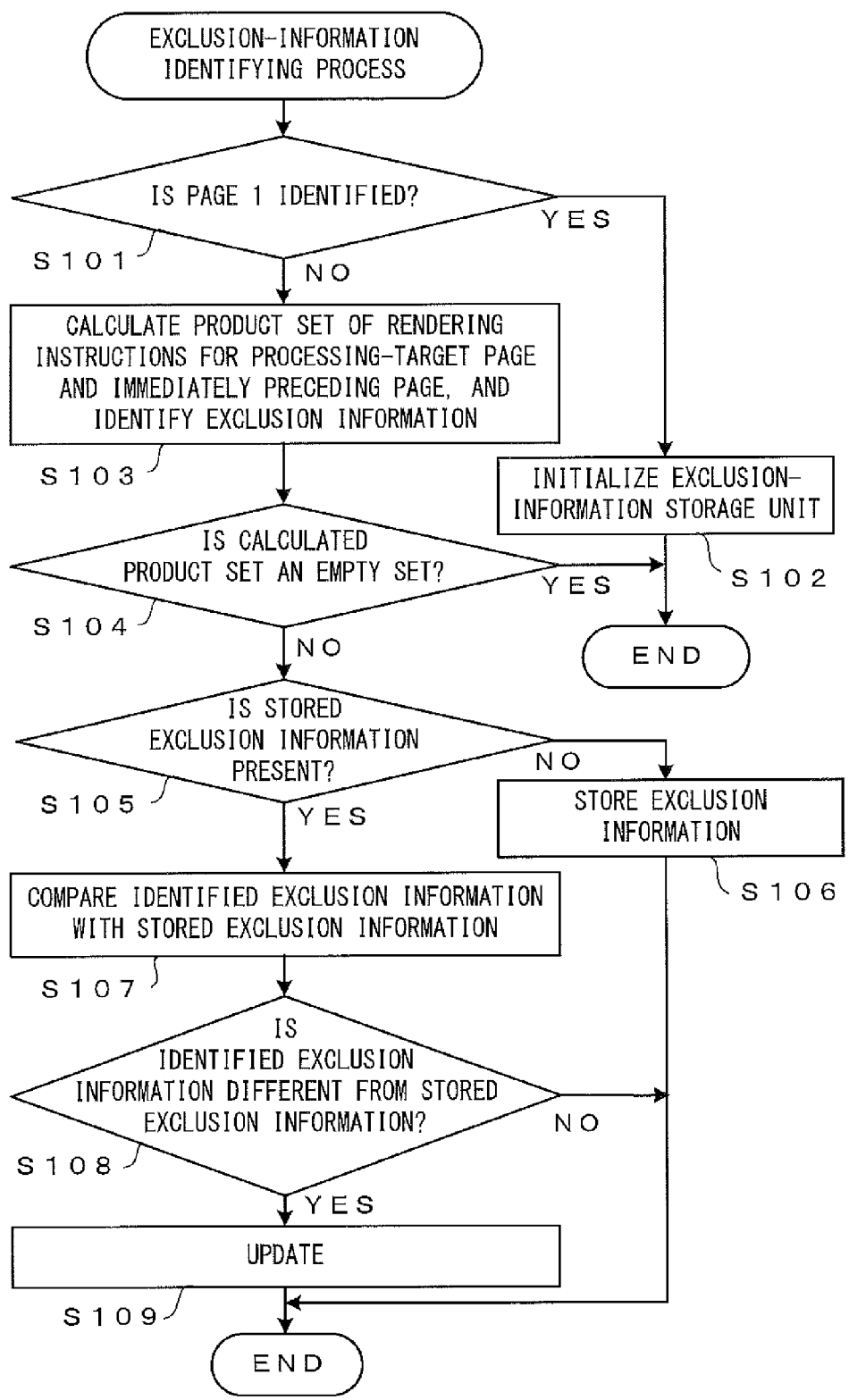
FIG. 5 is an exemplary flowchart illustrating the flow of an exclusion-information identifying process in accordance with embodiment 1.

With reference to FIG. 5, the following will describe the flow of an exclusion-information identifying process in accordance with embodiment 1. FIG. 5 is an exemplary flowchart illustrating the flow of the exclusion-information identifying process in accordance with embodiment 1. The exclusion-information identifying process corresponds to the process of step S008 of the blank sheet determination process.

The identifying process unit 17*d* determines whether an identified unprocessed page is page 1 (step S101). When the unprocessed page is judged to be page 1 (step S101: YES), the identifying process unit 17*d* initializes the exclusion-information storage unit 12*a* (step S102). Then, the flow ends, and step S009 of the blank sheet determination process starts.

When the identifying process unit 17*d* determines that the identified unprocessed page is not page 1 (step S101: NO), the identifying process unit 17*d* calculates the product set of rendering instructions for each processing-target page and for the immediately preceding page so as to identify exclusion information (step S103). The identifying process unit 17*d* determines whether the calculated product set is an empty set (step S104). When the identifying process unit 17*d* determines that the calculated product set is an empty set (step S104: YES), the flow ends, and step S009 of the blank sheet determination process starts.

When the identifying process unit 17*d* determines that the calculated product set is not an empty set (step S104: NO), the identifying process unit 17*d* further determines whether exclusion information is stored in the exclusion-information storage unit 12*a* (step S105). When the identifying process unit 17*d* determines that exclusion information is not stored (step S105: NO), the identifying process unit 17*d* stores identified exclusion information in the exclusion-information storage unit 12*a* (step S106). Then, the flow ends, and step S009 of the blank sheet determination process starts.

When the identifying process unit 17*d* determines that exclusion information is stored (step S105: YES), the identifying process unit 17*d* compares identified exclusion information with the stored exclusion information (step S107), and determines whether the identified information is different from the stored information (step S108). When the identifying process unit 17*d* determines that the identified information is identical with the stored information (step S108: NO), the flow ends, and step S009 of the blank sheet determination process starts.

When the identifying process unit 17*d* determines that the identified information is different from the stored information (step S108: YES), the identifying process unit 17*d* updates the exclusion information stored in the exclusion-information storage unit 12*a* with the identified exclusion information (step S109). Then, the flow ends, and step S009 of the blank sheet determination process starts.

With reference to FIGS. 2-5, the following will describe the blank sheet determination process in accordance with embodiment 1 under the concrete example of FIG. 3.

Since page 1 is an initial page (step S101: YES), the identifying process unit 17*d* initializes the exclusion-information storage unit 12*a* (step S102). The blank sheet determining unit 17*e* identifies objects OB1-OB3 as body objects (steps S009 and S010: YES). In this example, when a color of the body objects of page 1 is different from a sheet color (step S014: YES), the blank sheet determining unit 17*e* does not determine that page 1 is blank, and hence, as depicted in FIG. 2, the flag value of "blank flag" corresponding to page 1 in the page management table T1 remains "0".

In the processing of page 2, the product set for page 2 and page 1, i.e., the immediately preceding page, is an empty set (step S104: YES), as depicted in FIG. 3, and hence the blank sheet determining unit 17*e* identifies objects OB4-OB9 as body objects (steps S009 and S010: YES). In this example, when a color of the body objects of page 2 is different from the sheet color (step S014: YES), the blank sheet determining unit 17e does not determine that page 2 is blank, and hence, as depicted in FIG. 2, the flag value of "blank flag" corresponding to page 2 in the page management table T1 remains "0".

In the processing of page 3, the product set for page 3 and page 2, i.e., the immediately preceding page, is objects OB4-OB8 (step S104: NO), as depicted in FIG. 3. Since the exclusion-information storage unit 12a does not have exclusion information stored therein (step S105: NO), the identifying process unit 17d stores identified exclusion information (exclusion information indicating objects OB4-OB8) (step S106). The blank sheet determining unit 17e identifies a body object according to the exclusion information indicating objects OB4-OB8 (step S009). In view of the fact that the objects of page 3 are objects OB4-OB8, the blank sheet determining unit 17e determines that a body object has not been identified (step S010: NO). That is, the blank sheet determining unit 17e determines that page 3 is blank. The table managing unit 17c sets "1" as the flag value of "blank flag" corresponding to page 3 in the page management table T1 (step S011), as depicted in FIG. 2.

In the processing of page 4, the product set for page 4 and page 3, i.e., the immediately preceding page, is an empty set (step S104: YES), as depicted in FIG. 3, and hence the blank sheet determining unit 17e identifies object OB10 as a body object according to the exclusion information indicating objects OB4-OB8 (steps S009 and S010: YES). In this example, when a color of the body objects of page 4 is different from the sheet color (step S014: YES), the blank sheet determining unit 17e does not determine that page 4 is blank, and hence, as depicted in FIG. 2, the flag value of "blank flag" corresponding to page 4 in the page management table T1 remains "0".

In the processing of page 5, the product set for page 5 and page 4, i.e., the immediately preceding page, is an empty set (step S104: YES), as depicted in FIG. 3, and hence the blank sheet determining unit 17e identifies a body object according to the identification information indicating objects OB4-OB8 (step S009). In view of the fact that the objects of page 5 are objects OB4-OB8, the blank sheet determining unit 17e determines that a body object has not been identified (step S010: NO). That is, the blank sheet determining unit 17e determines that page 5 is blank. The table managing unit 17c sets "1" as the flag value of "blank flag" corresponding to page 5 in the page management table T1 (step S011), as depicted in FIG. 2.

In the processing of page 6, the product set for page 6 and page 5, i.e., the immediately preceding page, is, as depicted in FIG. 3, objects OB4-OB8 (step S104: NO), i.e., identical with the exclusion information stored in the exclusion-information storage unit 12a (step S108: NO). Accordingly, the blank sheet determining unit 17e identifies object OB11 as a body object according to the exclusion information indicating objects OB4-OB8 (steps S009 and S010: YES). In this example, when a color of the body object of page 6 is different from the sheet color (step S014: YES), the blank sheet determining unit 17e does not determine that page 6 is blank, and hence, as depicted in FIG. 2, the flag value of "blank flag" corresponding to page 6 in the page management table T1 remains "0".

In this example, as indicated in FIG. 2, only pages 1, 2, 4, and 6 are printed.

In accordance with embodiment 1, the printing apparatus 10 calculates the product set of rendering instructions for objects included in a processing-target page and rendering instructions for objects included in a page different from the processing-target page. Then, the printing apparatus 10 identifies a body object obtained by excluding the objects corresponding to the instructions included in the product set from the objects included in the processing-target page. Subsequently, the printing apparatus 10 determines whether a body object has been identified, and generates raster data after excluding a page for which a determination has been made that a body object has not been identified. A form that includes a header and/or a footer is, in many cases, identical with another page, and hence a rendering instruction for an object belonging to the form is highly likely to be included in the product set of rendering instructions for the form and rendering instructions for that another page. Thus, according to the product set, body objects that do not include objects belonging to a form can be identified. This enables a blank sheet determination to be made in consideration of a form without designating a region for which the blank sheet determination is to be performed, thereby improving the operability.

In accordance with embodiment 1, when a product set calculated in the processing of a processing-target page is an empty set, the printing apparatus 10 identifies a body object according to a product set that is not an empty set and that is calculated in the processing of another page. Such a configuration allows the accuracy of the blank sheet determination to be improved even when, for example, a document that includes a plurality of forms are processed.

In accordance with embodiment 1, the printing apparatus 10 identifies a sheet color and the colors of body objects, and generates raster data after excluding a page with body objects all having a color that is identical with the sheet color. Such a configuration allows the blank sheet determination to be made in consideration of the color of a sheet to be printed, and allows a waste of sheets to be eliminated.

<Embodiment 2>

In embodiment 2, according to the initial piece of exclusion information from among pieces of exclusion information such that the product set of rendering instructions for a processing-target page and for the immediately preceding page is not an empty set, the blank sheet determination is made for pages that precede the page corresponding to the initial piece of exclusion information, thereby improving the accuracy of the blank sheet determination.

FIG. 6 is a functional block diagram illustrating an exemplary configuration of a printing apparatus 10 that constitutes a printing system 100 in accordance with embodiment 2.

The basic configuration of the printing apparatus 10 in accordance with embodiment 2 is identical with that of the printing apparatus 10 in accordance with embodiment 1. However, as depicted in FIG. 6, embodiment 2 is different from embodiment 1 in the sense that the controlling unit 17 further includes a blank sheet redetermining unit 17g. The functions achieved by the determining unit 17a, the table managing unit 17c, the identifying process unit 17d, and the blank sheet determining unit 17e in embodiment 2 are slightly different from those achieved in embodiment 1. Embodiment 2 is different from embodiment 1 in the sense that the table storage unit 12b further has an exclusion-information management table T2 stored therein.

With reference to FIG. 7, the following will describe the exclusion-information management table T2 in accordance with embodiment 2. FIG. 7 illustrates an exemplary configuration of an exclusion-information management table T2 in accordance with embodiment 2.

The exclusion-information management table T2 in accordance with embodiment 2 is a table for correlating and managing exclusion information for a situation in which the product set of rendering instructions for a processing-target page and for the immediately preceding page is not an empty set, and pages after the identification of the exclusion information. For example, the table managing unit 17c may be referred to in resetting the flag of a page preceding a page corresponding to the initial piece of exclusion information from among the flags registered in the page management table T1. As depicted in FIG. 7, the exclusion-information management table T2 in accordance with embodiment 2 correlates each "page number" with an "exclusion-information identifier".

The "exclusion-information identifier" is capable of uniquely identifying exclusion information when the product set of rendering instructions for a processing-target page and for the immediately preceding page is not an empty set. Such "exclusion-information identifier" is generated by the identifying process unit 17d and is stored in a corresponding field of "exclusion-information identifier" by the table managing unit 17c.

Referring to FIG. 6 again, the controlling unit 17 consists of, for example, a CPU and executes an operation program stored in a program area of the storage unit 12. This allows the controlling unit 17 to function as the determining unit 17a, the sheet color identifying unit 17b, the table managing unit 17c, the identifying process unit 17d, the blank sheet determining unit 17e, the RIP processing unit 17f, and the blank sheet redetermining unit 17g, as depicted in FIG. 6. In addition, the controlling unit 17 performs processes such as a controlling process for controlling the entirety of the printing apparatus 10 and a blank sheet determination process that will be described hereinafter in detail.

In addition, the determining unit 17a determines whether exclusion information such that the product set of rendering instructions for a processing-target page and for the immediately preceding page is not an empty set is present. More particularly, the determining unit 17a searches fields of "exclusion-information identifier" in the exclusion-information management table T2 and, according to whether an exclusion-information identifier is registered, determines whether exclusion information such that the product set for a page and the immediately preceding page is not an empty set is present. That is, when an exclusion-information identifier is registered, the determining unit 17a determines that exclusion information is present; otherwise, the determining unit 17a determines that exclusion information is not present.

The table managing unit 17c manages the page management table T1 and the exclusion-information management table T2. More particularly, upon receipt of a print job, the table managing unit 17c initializes the page management table T1 and the exclusion-information management table T2. The table managing unit 17c analyzes the received print job and registers as many entries as the number of pages of processing-target document data in each of the tables. When the identifying process unit 17d obtains rendering information of an unprocessed page, the table managing unit 17c sets "1" as a flag value of "processing-target flag" corresponding to the obtained page. When the processing-target page is judged to be blank, the table managing unit 17c sets "1" as a flag value of "blank flag" corresponding to the page judged to be blank.

When the determining unit 17a determines that pieces of exclusion information such that the product set of rendering instructions for a processing-target page and for the immediately preceding page is not an empty set are present, the table managing unit 17c resets the flags of an entry in the page management table T1 that precedes a page corresponding to the initial piece of exclusion information from among the pieces of exclusion information. That is, a process is performed for returning to an unprocessed state. Referring to, for example, FIG. 7, in view of the fact that the initial piece of exclusion information such that the product set is not an empty set is the exclusion information of page 3, the table managing unit 17c resets the flags of the entries of pages 1 and 2 in the page management table T1.

When a piece of identified exclusion information is different from pieces of exclusion information stored in the exclusion-information storage unit 12a, the table managing unit 17c stores an exclusion-information identifier generated by the identifying process unit 17d in a corresponding field in the exclusion-information management table T2. On the other hand, when pieces of exclusion information stored in the exclusion-information storage unit 12a include a piece of exclusion information that is identical with a piece of identified exclusion information, the table managing unit 17c stores the exclusion-information identifier of the piece of identical exclusion information identified by the identifying process unit 17d in a corresponding field in the exclusion-information management table T2.

The identifying process unit 17d performs a process of identifying exclusion information for a processing-target page according to a rendering instruction for each object included on pages.

More particularly, the identifying process unit 17d searches fields of "processing-target flag" in the page management table T1 so as to identify a page with the lowest page number from among unprocessed pages. Then, the identifying process unit 17d analyzes a received print job and obtains rendering information of the identified unprocessed page. Unless the identified unprocessed page is the initial page (page 1), the product set of rendering instructions for the processing-target page and for the immediately preceding page is calculated to identify exclusion information.

When the calculated product set is not an empty set and exclusion information is stored in the exclusion-information storage unit 12a, the identifying process unit 17d compares the identified exclusion information with the stored exclusion information. After the comparing, when the identified exclusion information is different from the stored exclusion information, the identifying process unit 17d generates an exclusion-information identifier capable of uniquely identifying the identified exclusion information, and stores the generated exclusion-information identifier in the exclusion-information storage unit 12a after assigning this identifier to the identified exclusion information. When the calculated product set is not an empty set and exclusion information is not stored in the exclusion-information storage unit 12a, the identifying process unit 17d generates an exclusion-information identifier capable of uniquely identifying the identified exclusion information, and stores the generated exclusion-information identifier in the exclusion-information storage unit 12a after assigning this identifier to the identified exclusion information.

After the comparing, when identical exclusion information is stored, the identifying process unit 17d identifies an exclusion-information identifier assigned to the identical exclusion information.

The blank sheet determining unit 17e makes a blank sheet determination for determining whether a processing-target page is blank. More particularly, when exclusion information is stored in the exclusion-information storage unit 12a, the blank sheet determining unit 17e refers to the exclusion-information management table T2 so as to identify the latest exclusion information from among the exclusion information stored in the exclusion-information storage unit 12a. Referring to, for example, FIG. 7, when page 5 is a processing-target page, the exclusion information corresponding to page 3 is identified. When page 6 is a processing-target page, the blank sheet determining unit 17e identifies the exclusion information corresponding to page 6.

The blank sheet determining unit 17e identifies a body object included in the processing-target page according to the identified exclusion information. In this case, when exclusion information is not stored in the exclusion-information storage unit 12a, the blank sheet determining unit 17e identifies, as a body object, an object obtained by excluding a null character from objects included in the processing-target page. When a body object is not identified, the blank sheet determining unit 17e determines that the processing-target page is blank.

When a body object(s) is identified, the blank sheet determining unit 17e identifies a color of each body object according to rendering instructions for objects. The blank sheet determining unit 17e compares the identified colors of the body object(s) with a sheet color identified by the sheet color identifying unit 17b. When a body object whose color is different from the sheet color is not present, the blank sheet determining unit 17e determines that the processing-target page is blank.

When pieces of exclusion information such that the product set of rendering instructions for a processing-target page and for the immediately preceding page is not an empty set are present, the blank sheet redetermining unit 17g makes the blank sheet determination for a page preceding a page corresponding to the initial piece of exclusion information such that the product set is not an empty set.

More particularly, the blank sheet redetermining unit 17g identifies the initial exclusion information such that the product set is not an empty set, and, according to the identified exclusion information, identifies individual body objects included in a page preceding a page corresponding to the initial exclusion information such that the product set is not an empty set. When a body object is not identified, the blank sheet redetermining unit 17g determines that the processing-target page is blank.

When a body object(s) is identified, the blank sheet redetermining unit 17g identifies a color of each body object according to rendering instructions for objects. The blank sheet redetermining unit 17g compares the identified color of each body object with a sheet color identified by the sheet color identifying unit 17b. When a body object whose color is different from the sheet color is not present, the blank sheet redetermining unit 17g determines that the processing-target page is blank.

Figure 8:
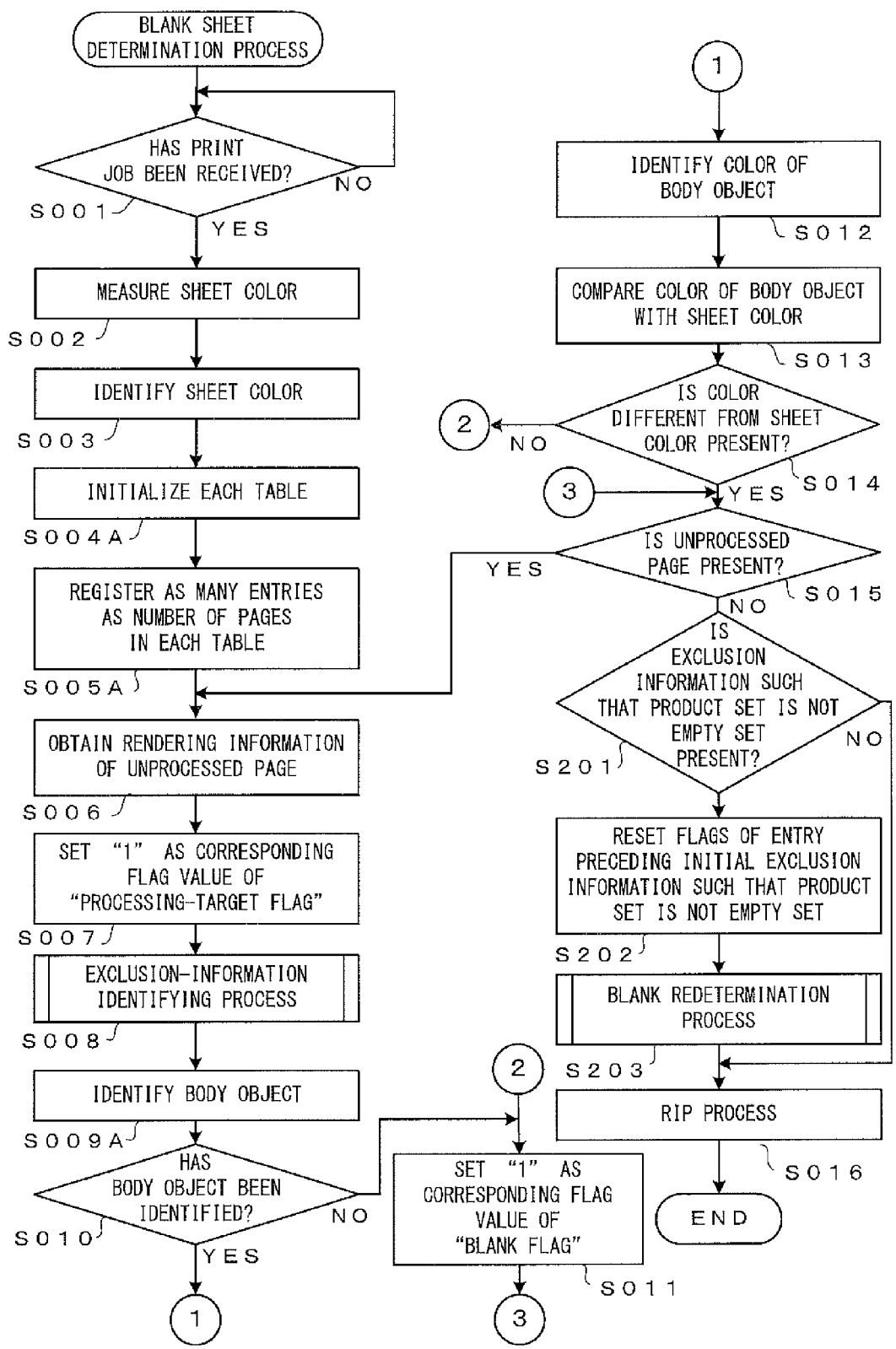
FIG. 8 is an exemplary flowchart illustrating the flow of a blank sheet determination process in accordance with embodiment 2.

With reference to FIG. 8, the following will describe the flow of a blank sheet determination process in accordance with embodiment 2. FIG. 8 is an exemplary flowchart illustrating the flow of the blank sheet determination process in accordance with embodiment 2. Reception of a print job triggers the blank sheet determination process.

Like processes are given like reference marks to those used in embodiment 1. The following will mainly describe different processes.

The table managing unit 17c initializes the page management table T1 and the exclusion-information management table T2 (step S004A) and registers as many entries as the number of pages of processing-target document data in each of the tables (step S005A). The identifying process unit 17d refers to the page management table T1 so as to identify an unprocessed page, and obtains rendering information of the identified unprocessed page (step S006).

The table managing unit 17c sets "1" as a corresponding flag value of "processing-target flag" in the page management table T1 (step S007). The identifying process unit 17d performs an exclusion-information identifying process (step S008).

The blank sheet determining unit 17e identifies the latest exclusion information from among the exclusion information stored in the exclusion-information storage unit 12a, and identifies a body object of a processing-target page according to the identified exclusion information (step S009A). When exclusion information is not stored in the exclusion-information storage unit 12a, the blank sheet determining unit 17e identifies, as a body object, an object obtained by excluding a null character from the objects included in the processing-target page. Then, the flow shifts to step S010, described above with reference to embodiment 1.

When the determining unit 17a determines in the process of step S015 that an unprocessed page is not present (step S015: NO), the determining unit 17a further determines whether exclusion information such that the product set of rendering instructions for a processing-target page and for the previously preceding page is not an empty set is present (step S201). When the determining unit 17a determines that exclusion information such that the product set of rendering instructions for a processing-target page and for the previously preceding page is not an empty set is not present (step S201: NO), the flow shifts to step S016, described above with reference to embodiment 1.

When the determining unit 17a determines that pieces of exclusion information such that the product set of rendering instructions for a processing-target page and for the immediately preceding page is not an empty set are present (step S201: YES), the table managing unit 17c resets the flags of an entry in the page management table T1 that precedes a page corresponding to the initial piece of exclusion information such that the product set is not an empty set (step S202).

The blank sheet redetermining unit 17g makes the blank redetermination for a page preceding the page corresponding to the initial exclusion information such that the product set is not an empty set (step S203). The RIP processing unit 17f refers to the page management table T1 so as to generate raster data by performing a RIP process on pages other than the pages judged to be blank (step S016). Then, the flow ends.

Figure 9:
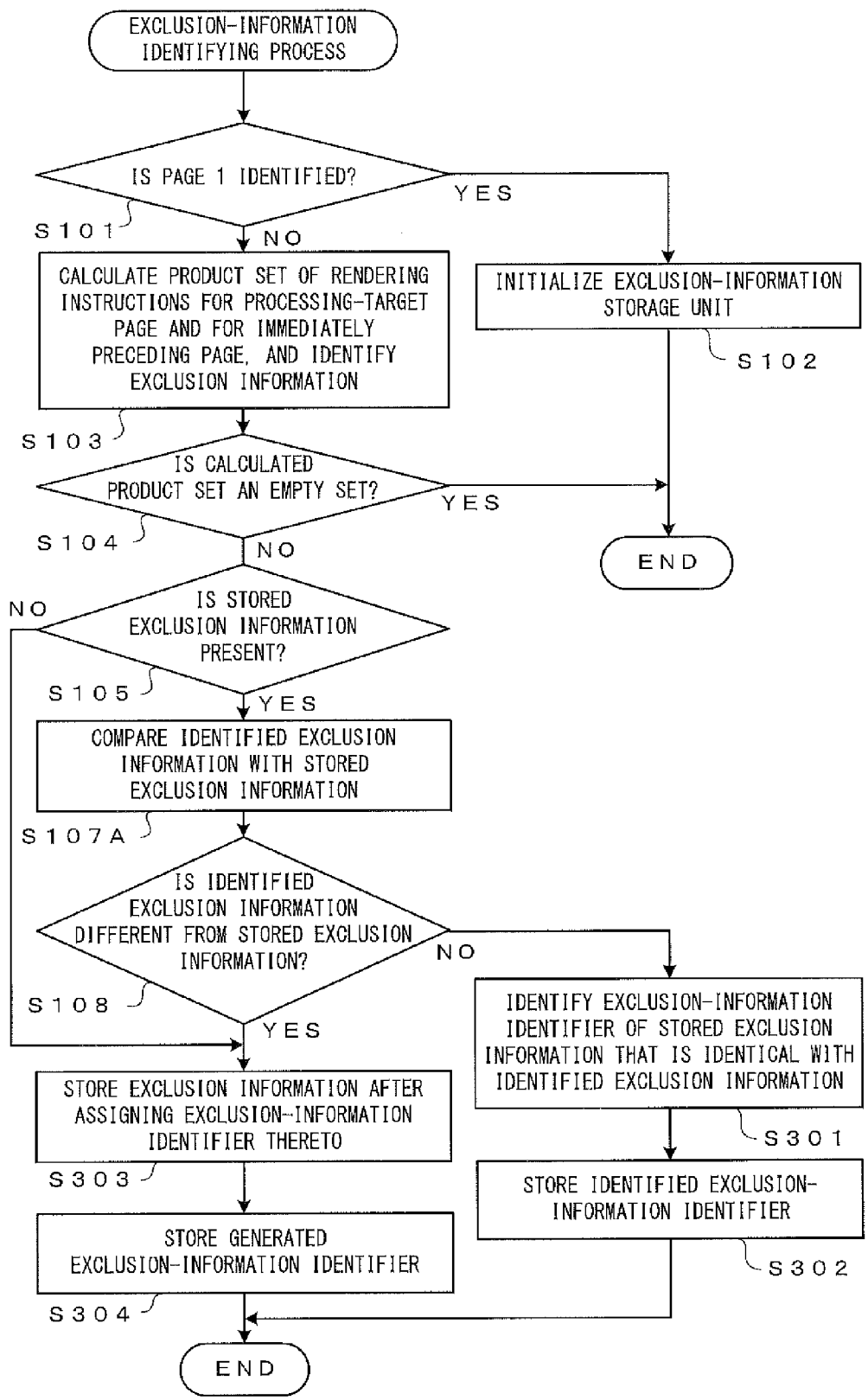
FIG. 9 is an exemplary flowchart illustrating the flow of an exclusion-information identifying process in accordance with embodiment 2.

With reference to FIG. 9, the following will describe the flow of an exclusion-information identifying process in accordance with embodiment 2. FIG. 9 is an exemplary flowchart illustrating the flow of the exclusion-information identifying process in accordance with embodiment 2. The exclusion-information identifying process corresponds to step S008 of the blank sheet determination process. Like processes are given like reference marks to those used in embodiment 1. The following will mainly describe different processes.

When the identifying process unit 17d determines that a calculated product set is not an empty set (step S104: NO), the identifying process unit 17d further determines whether exclusion information is stored in the exclusion-information storage unit 12a (step S105). When the identifying process unit 17d determines that exclusion information is not stored (step S105: NO), the flow shifts to step S303, which will be described hereinafter.

When the identifying process unit 17d determines that exclusion information is stored (step S105: YES), the identifying process unit 17d compares identified exclusion information with the stored exclusion information (step S107A), and determines whether the identified information is different from the stored information (step S108). When the identifying process unit 17d determines that the identified information is identical with the stored information (step S108: NO), the identifying process unit 17d identifies the exclusion-information identifier of the stored exclusion information that is identical with the identified exclusion information (step S301). The table managing unit 17c stores the identified exclusion-information identifier in a corresponding field of "exclusion-information identifier" in the exclusion-information management table T2 (step S302). Then, the flow ends, and step S009A of the blank sheet determination process starts.

When the identifying process unit 17d determines that the identified information is different from the stored information (step S108: YES), the identifying process unit 17d generates an exclusion-information identifier capable of uniquely identifying the identified exclusion information, and stores the generated exclusion-information identifier in the exclusion-information storage unit 12a after assigning this identifier to the identified exclusion information (step S303). The table managing unit 17c stores the generated exclusion-information identifier in a corresponding field of "exclusion-information identifier" in the exclusion-information management table T2 (step S304). Then, the flow ends, and step S009A of the blank sheet determination process starts.

Figure 10:
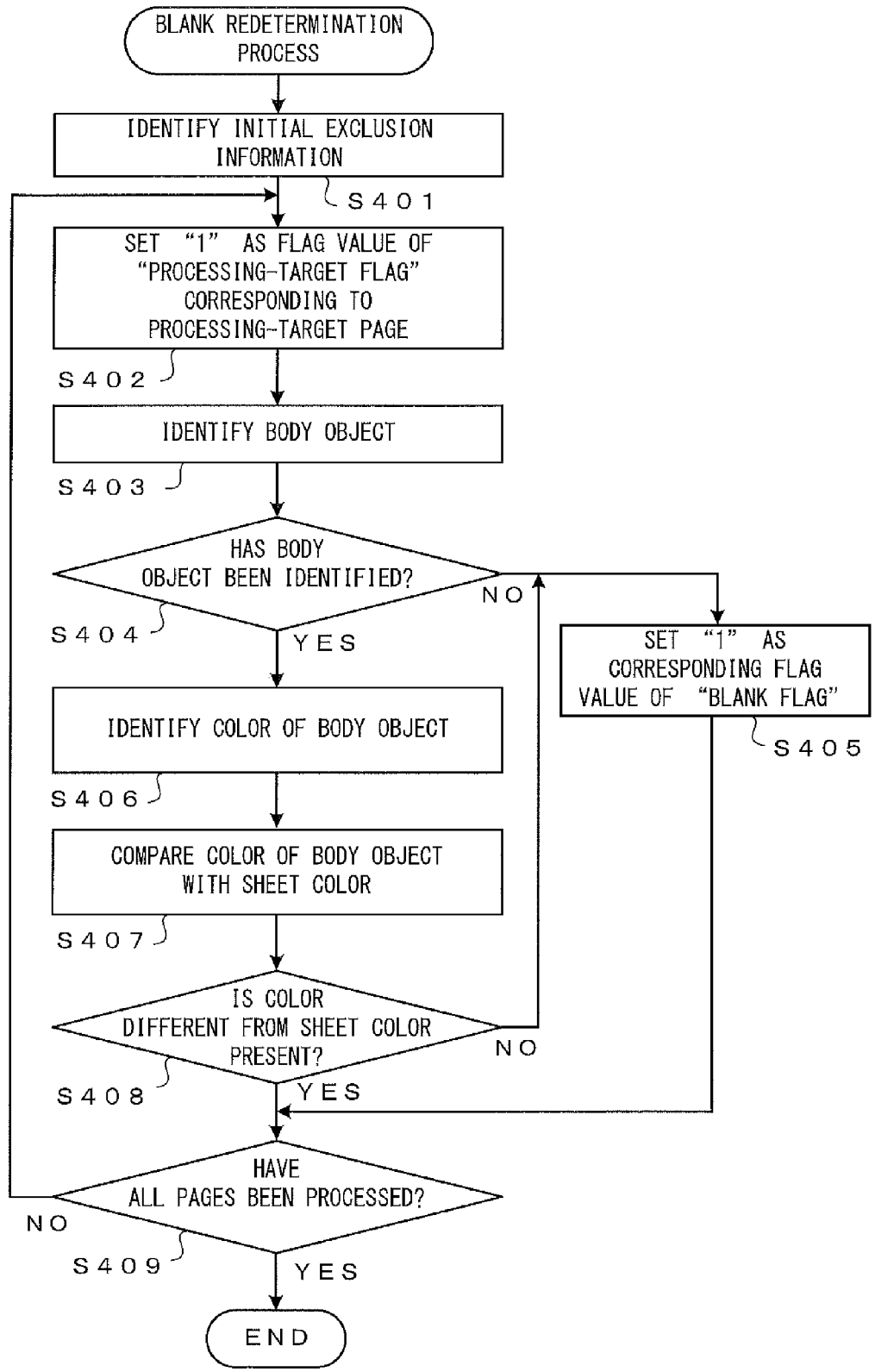
FIG. 10 is an exemplary flowchart illustrating the flow of a blank redetermination process in accordance with embodiment 2.

With reference to FIG. 10, the following will describe the flow of a blank redetermination process in accordance with embodiment 2. FIG. 10 is an exemplary flowchart illustrating the flow of a blank redetermination process in accordance with embodiment 2. The blank redetermination process corresponds to step S203 of the blank sheet determination process in accordance with embodiment 2.

The blank sheet redetermining unit 17g identifies the initial exclusion information such that a product set is not an empty set (step S401). The table managing unit 17c sets "1" as a flag value of "processing-target flag" that corresponds to a processing-target page preceding a page corresponding to the initial exclusion information such that a product set is not an empty set (step S402). According to the identified exclusion information, the blank sheet redetermining unit 17g identifies a body object included in the processing-target page (step S403).

The blank sheet redetermining unit 17g determines whether a body object has been identified (step S404). When the blank sheet redetermining unit 17g determines that a body object has not been identified (step S404: NO), i.e., when the processing-target page is judged to be blank, the table managing unit 17c sets "1" as a corresponding flag value of "blank flag" in the page management table T1 (step S405). Then, the flow shifts to step S409, which will be described hereinafter.

When the blank sheet redetermining unit 17g determines that a body object (s) has been identified (step S404: YES), the blank sheet redetermining unit 17g identifies a color of each body object according to rendering instructions for objects (step S406). The blank sheet redetermining unit 17g compares the identified color of each body object with a sheet color identified by the sheet color identifying unit 17b (step S407), and determines whether a body object whose color is different from the sheet color is present (step S408).

When the blank sheet redetermining unit 17g determines that a body object whose color is different from the sheet color is not present (step S408: NO), i.e., when the blank sheet redetermining unit 17g determines that the processing-target page is blank, the table managing unit 17c sets "1" as a corresponding flag value of "blank flag" in the page management table T1 (step S405). Then, the flow shifts to step S409, which will be described hereinafter.

When the blank sheet redetermining unit 17g determines that a body object whose color is different from the sheet color is present (step S408: YES), the determining unit 17a determines whether all of the pages have been processed (step S409). When the determining unit 17a determines that not all of the pages have been processed (step S409: NO), the flow returns to step S402, and the processes described above are repeated.

When the determining unit 17a determines that all of the pages have been processed (step S409: YES), the flow ends, and step S016 of the blank sheet determination process in accordance with embodiment 2 starts.

Figure 11:
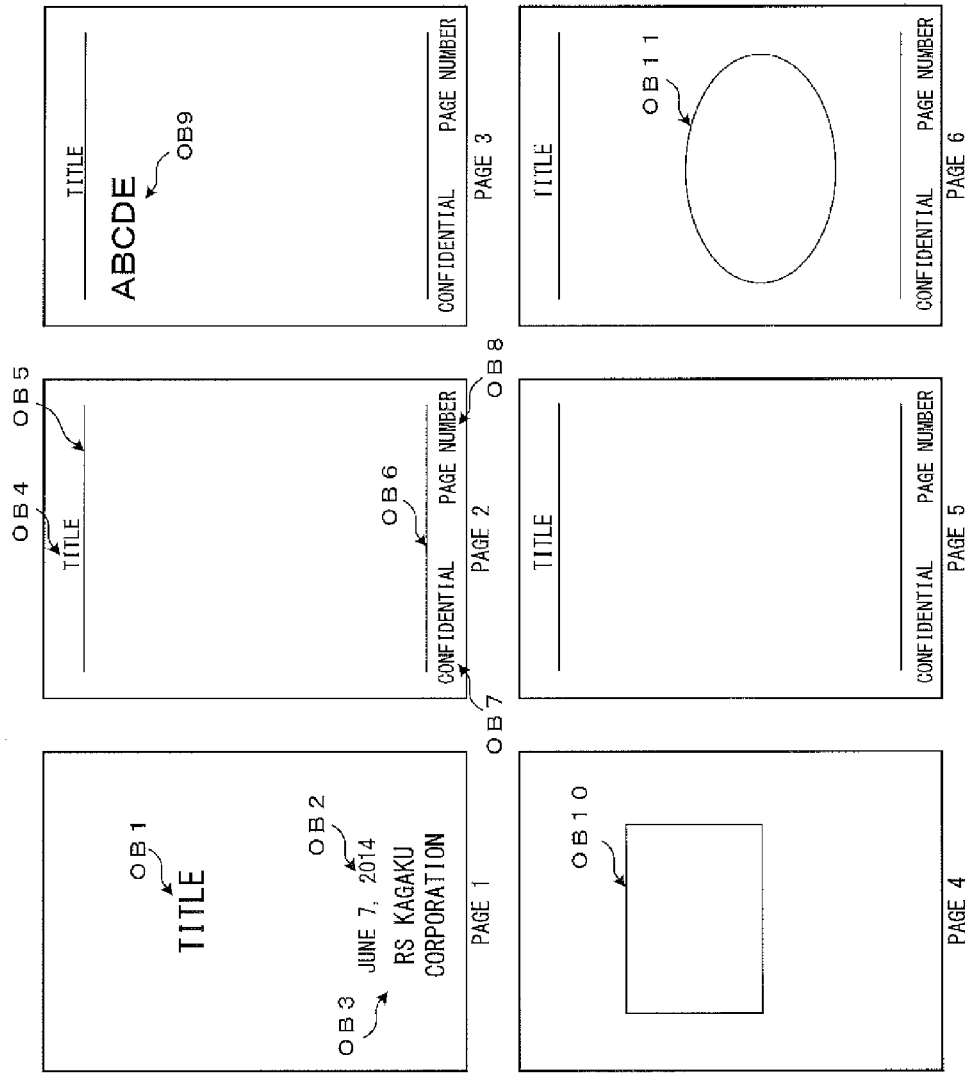
FIG. 11 illustrates a concrete example of document data that is a processing target in accordance with embodiment 2.

With reference to FIGS. 7-12C, the following will describe the blank sheet determination process in accordance with embodiment 2 by focusing on the blank redetermination process under the concrete example of FIG. 11. FIG. 11 illustrates a concrete example of document data that is a processing target in accordance with embodiment 2. FIGS. 12A, 12B, and 12C each illustrate the state of the page management table T1 at a point in processing time, the state corresponding to the concrete example in FIG. 11.

Assume that FIG. 12A depicts the state of the page management table T1 as of a point in time when the determining unit 17a determines in step S015 of the blank sheet determination process that a unprocessed page is not present. Assume that FIG. 7 depicts the state of the exclusion-information management table T2 as of that point in time. That is, exclusion information such that the product set of rendering instructions for a processing-target page and for the immediately preceding page is not an empty set is the exclusion information corresponding to page 3.

In this case, the table managing unit 17c resets the flags of entries in the page management table T1 that correspond to pages 1 and 2, i.e., pages preceding page 3 (step S202). That is, in this example, pages 1 and 2 are subject to the blank redetermination process, and FIG. 12B detects a state achieved after the flags of entries corresponding to pages 1 and 2 are reset.

In the processing of page 1, the blank sheet redetermining unit 17g identifies the exclusion information corresponding to page 3 (EX1) as the initial exclusion information such that a product set is not an empty set (step S401). As depicted in FIG. 11, the exclusion information corresponding to page 3 (EX1) indicates objects OB4-OB8. The table managing unit 17c sets "1" as a flag value of "processing-target flag" corresponding to a processing-target page (step S402). As depicted in FIG. 11, the blank sheet redetermining unit 17g identifies objects OB1-OB3 as body objects according to the identified exclusion information (EX1) (steps S403 and S404: YES). In this example, when a color of the body objects on page 1 is different from a sheet color (step S408: YES), the blank sheet redetermining unit 17g does not determine that page 1 is blank, and hence, as depicted in FIG. 12C, a flag value of "blank flag" corresponding to page 1 in the page management table T1 remains "0".

In the processing of page 2, the table managing unit 17c sets "1" as a flag value of "processing-target flag" corresponding to processing-target page 2 (step S402). The blank sheet redetermining unit 17g identifies a body object according to the identified exclusion information (EX1) (step S403). The objects included on page 2 are, as depicted in FIG. 11, objects OB4-OB8, and hence the blank sheet redetermining unit 17g determines that a body object has not been identified (step S404: NO). That is, the blank sheet redetermining unit 17g determines that page 2 is blank. As depicted in FIG. 12C, the table managing unit 17c sets "1" as a flag value of "blank flag" corresponding to page 2 in the page management table T1 (step S405).

FIG. 12C depicts the state of the page management table T1 as of a point in time when the determining unit 17a determines in step S409 of the blank redetermination process that all of the pages have been processed. That is, FIG. 12C indicates that page 2, which was judged to be not blank in the blank sheet determination process performed by the blank sheet determining unit 17e, is judged to be blank in the blank redetermination process. In fact, as depicted in FIG. 11, all of the objects included on page 2 belong to a form, indicating that the determination made in the blank redetermination process is correct.

In embodiment 2 described above, according to the initial exclusion information such that the product set of rendering instructions for a processing-target page and for another page is not an empty set, the printing apparatus 10 makes the blank sheet determination for a page preceding the page corresponding to the initial exclusion information. Such a configuration allows the accuracy of a blank sheet determination to be improved for a page for which a blank sheet determination is likely to have been inappropriately made.

<Embodiment 3>

In embodiment 3, the blank sheet determination is made again for a page judged to be blank, according to the initial exclusion information corresponding to a page following the page judged to be blank, thereby improving the accuracy of the blank sheet determination.

FIG. 6 is also a functional block diagram illustrating an exemplary configuration of a printing apparatus 10 that constitutes a printing system 100 in accordance with embodiment 3.

The basic configuration of the printing apparatus 10 in accordance with embodiment 3 is identical with that of the printing apparatus 10 in accordance with embodiment 1. However, as depicted in FIG. 6, embodiment 3 is different from embodiment 1 in the sense that the controlling unit 17 further includes a blank sheet redetermining unit 17g. The functions achieved by the determining unit 17a, the table managing unit 17c, the identifying process unit 17d, and the blank sheet determining unit 17e in embodiment 3 are slightly different from those achieved in embodiment 1. Embodiment 3 is different from embodiment 1 in the sense that the table storage unit 12b further stores an exclusion-information management table T2.

The functions achieved by the identifying process unit 17d and the blank sheet determining unit 17e in embodiment 3 are identical with those described above with reference to embodiment 2. The exclusion-information management table T2 in embodiment 3 is identical with the exclusion-information management table T2 described above with reference to embodiment 2.

The controlling unit 17 consists of, for example, a CPU and executes an operation program stored in a program area of the storage unit 12. This allows the controlling unit 17 to function as the determining unit 17a, the sheet color identifying unit 17b, the table managing unit 17c, the identifying process unit 17d, the blank sheet determining unit 17e, the RIP processing unit 17f, and the blank sheet redetermining unit 17g, as depicted in FIG. 6. In addition, the controlling unit 17 performs processes such as a controlling process for controlling the entirety of the printing apparatus 10 and a blank sheet determination process that will be described hereinafter in detail.

Moreover, the determining unit 17a refers to the page management table T1 so as to determine whether a white flag has been set. That is, the determining unit 17a determines whether a page judged to be blank in the blank sheet determination process is present.

The table managing unit 17c manages the page management table T1 and the exclusion-information management table T2. More particularly, upon receipt of a print job, the table managing unit 17c initializes the page management table T1 and the exclusion-information management table T2. The table managing unit 17c analyzes the received print job and registers as many entries as the number of pages of processing-target document data in each of the tables. When the identifying process unit 17d obtains rendering information of an unprocessed page, the table managing unit 17c sets "1" as a flag value of "processing-target flag" corresponding to the obtained page. When a processing-target page is judged to be blank, the table managing unit 17c sets "1" as a flag value of "blank flag" corresponding to the page judged to be blank.

When the determining unit 17a determines that a blank flag has been set, the table managing unit 17c resets the flags of an entry in the page management table T1 for which the blank flag has been set. That is, a process is performed for returning to an unprocessed state.

When a piece of identified exclusion information is different from pieces of exclusion information stored in the exclusion-information storage unit 12a, the table managing unit 17c stores an exclusion-information identifier generated by the identifying process unit 17d in a corresponding field in the exclusion-information management table T2. On the other hand, when pieces of exclusion information stored in the exclusion-information storage unit 12a include a piece of exclusion information that is identical with a piece of identified exclusion information, the table managing unit 17c stores the exclusion-information identifier of the piece of identical exclusion information identified by the identifying process unit 17d in a corresponding field in the exclusion-information management table T2.

With reference to a page judged to be blank in the blank sheet determination process performed by the blank sheet determining unit 17e, the blank sheet redetermining unit 17g makes the blank sheet determination again according to the initial exclusion information such that the product set of rendering instructions for a page that follows the judged page and for the immediately preceding page is not an empty set.

More particularly, the blank sheet redetermining unit 17g identifies the initial exclusion information such that the product set of rendering instructions for a page following a page judged to be blank and for the immediately preceding page is not an empty set. When the initial exclusion information is identified, the blank sheet redetermining unit 17g identifies, according to the identified exclusion information, each body object included in the processing-target page judged to be blank. When a body object is not identified, the blank sheet redetermining unit 17g determines that the processing-target page is blank.

When a body object(s) is identified, the blank sheet redetermining unit 17g identifies a color of each body object according to rendering instructions for objects. The blank sheet redetermining unit 17g compares the identified color of each body object with a sheet color identified by the sheet color identifying unit 17b. When a body object whose color is different from the sheet color is not present, the blank sheet determining unit 17e determines that the processing-target page is blank.

Figure 13:
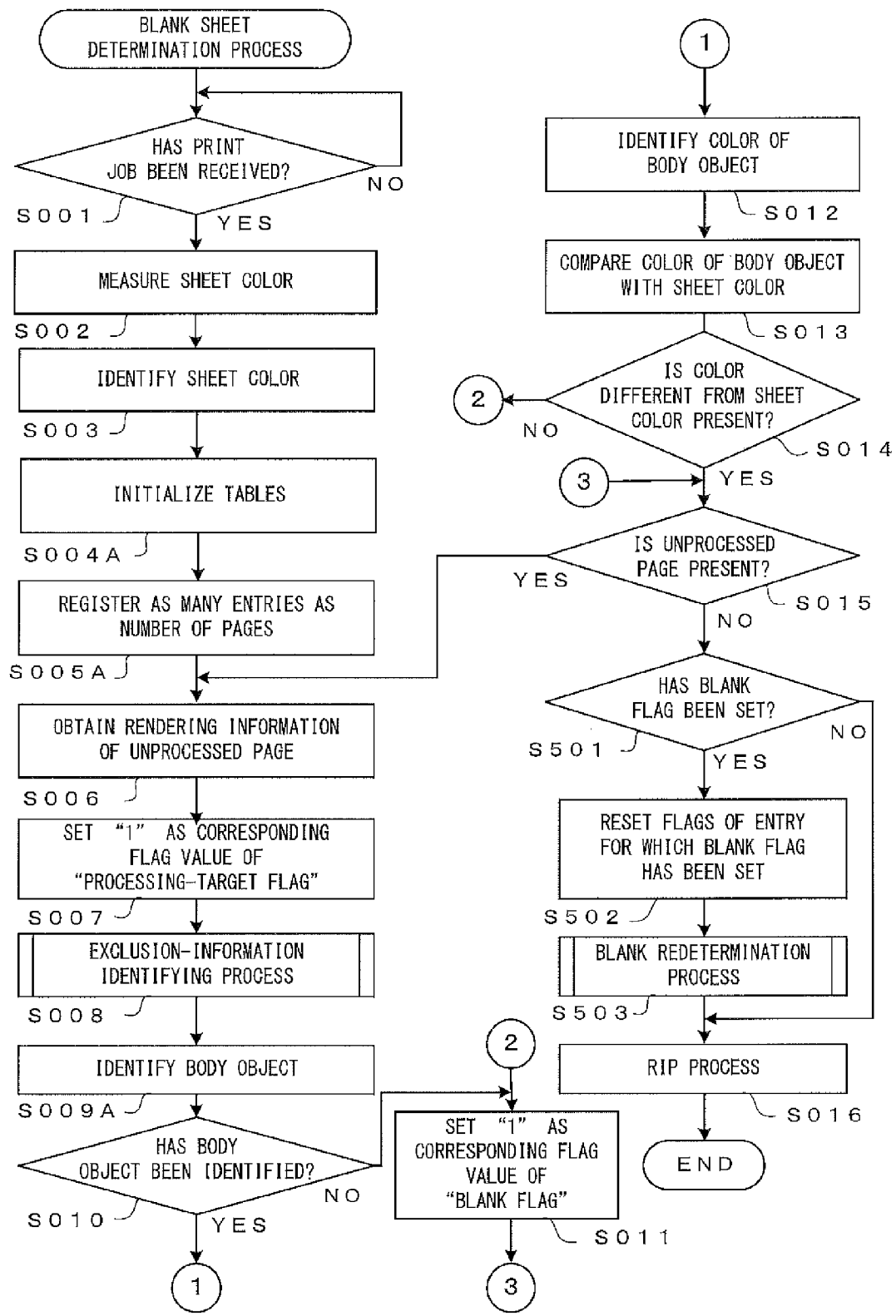
FIG. 13 is an exemplary flowchart illustrating the flow of a blank sheet determination process in accordance with embodiment 3.

With reference to FIG. 13, the following will describe the flow of a blank sheet determination process in accordance with embodiment 3. FIG. 13 is an exemplary flowchart illustrating the flow of the blank sheet determination process in accordance with embodiment 3. Reception of a print job triggers the blank sheet determination process.

Like processes are given like reference marks to those used in embodiment 1 (or 2). The following will mainly describe different processes.

When the determining unit 17a determines in the process of step S015 that an unprocessed page is not present (step S015: NO), the determining unit 17a further determines whether a blank flag has been set (step S501). When the determining unit 17a determines that a blank flag has not been set (step S501: NO), the flow shifts to step S016, described above with reference to embodiment 1.

When the determining unit 17a determines that a blank flag has been set (step S501: YES), the table managing unit 17c resets the flags of entries in the page management table T1 for which the blank flag has been set (step S502).

The blank sheet redetermining unit 17g makes the blank sheet determination again for a page judged to be blank by the blank sheet determining unit 17e (step S503). The RIP processing unit 17f refers to the page management table T1 so as to generate raster data by performing a RIP process for the pages other than the page judged to be blank (step S016). Then, the flow ends.

Figure 14:
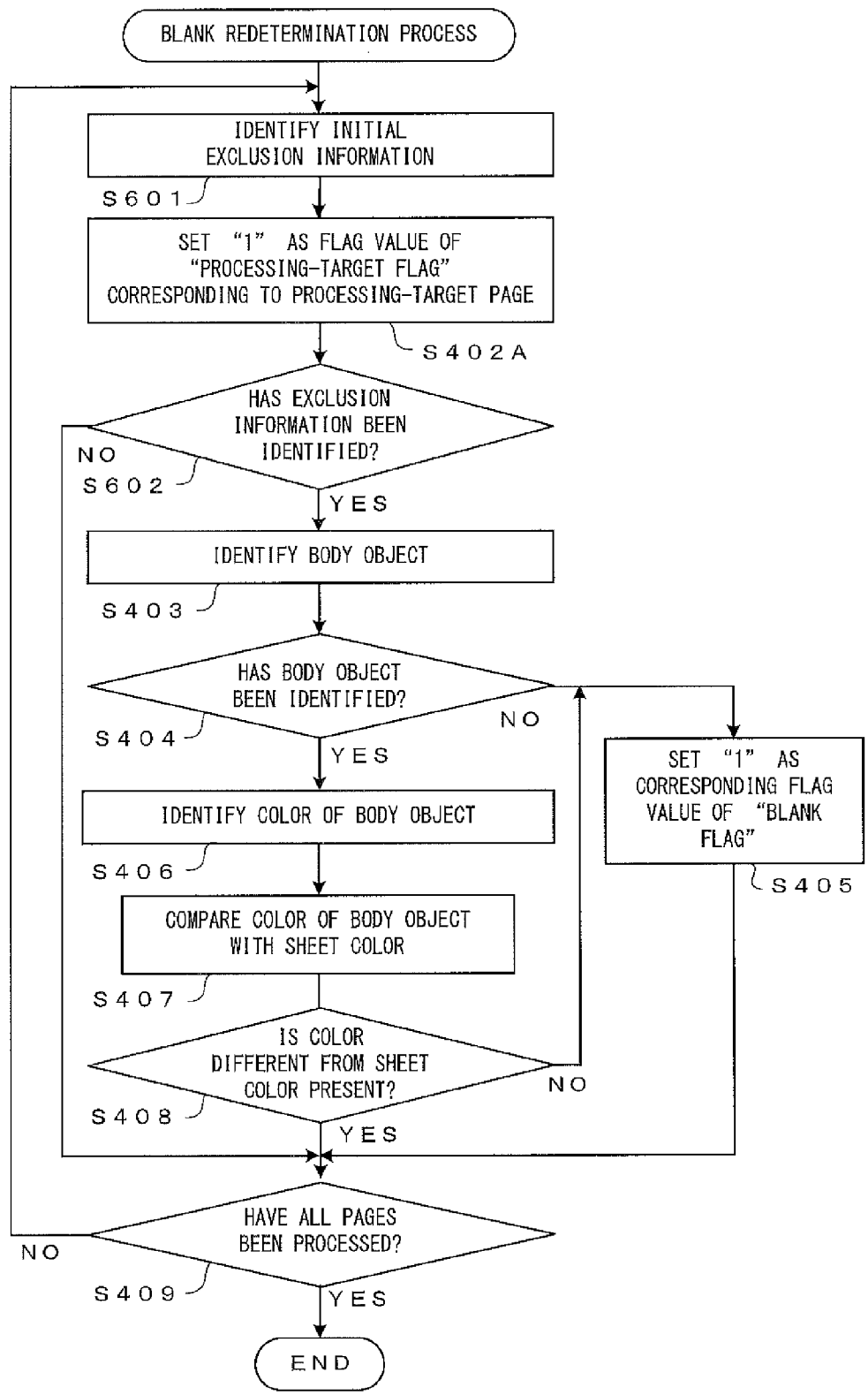
FIG. 14 is an exemplary flowchart illustrating the flow of a blank redetermination process in accordance with embodiment 3.

With reference to FIG. 14, the following will describe the flow of a blank redetermination process in accordance with embodiment 3. FIG. 14 is an exemplary flowchart illustrating the flow of the blank redetermination process in accordance with embodiment 3. The blank redetermination process corresponds to step S503 of the blank sheet determination process in accordance with embodiment 3.

Like processes are given like reference marks to those used in embodiment 2. The following will mainly describe different processes.

The blank sheet redetermining unit 17g identifies the initial exclusion information such that the product set of rendering instructions for a page following a processing-target page judged to be blank and for the immediately preceding page is not an empty set (step S601). The table managing unit 17c sets "1" as a flag value of "processing-target flag" corresponding to the processing-target page judged to be blank (step S402A).

The blank sheet redetermining unit 17g determines whether exclusion information has been identified (step S602). When the blank sheet redetermining unit 17g determines that exclusion information has not been identified (step S602: NO), the flow shifts to step S409, described above with reference to embodiment 2.

When the blank sheet redetermining unit 17g determines that exclusion information has been identified (step S602: YES), the blank sheet redetermining unit 17g identifies a body object included in the processing-target page according to the identified exclusion information (step S403). Then, the flow shifts to step S404, described above with reference to embodiment 2.

In step S409, the determining unit 17a determines whether all of the pages have been processed (step S409). When the determining unit 17a determines that not all of the pages have been processed (step S409: NO), the flow returns to step S601, and the processes described above are repeated.

When the determining unit 17a determines that all of the pages have been processed (step S409: YES), the flow ends, and step S016 of the blank sheet determination process in accordance with embodiment 3 starts.

Figure 15:
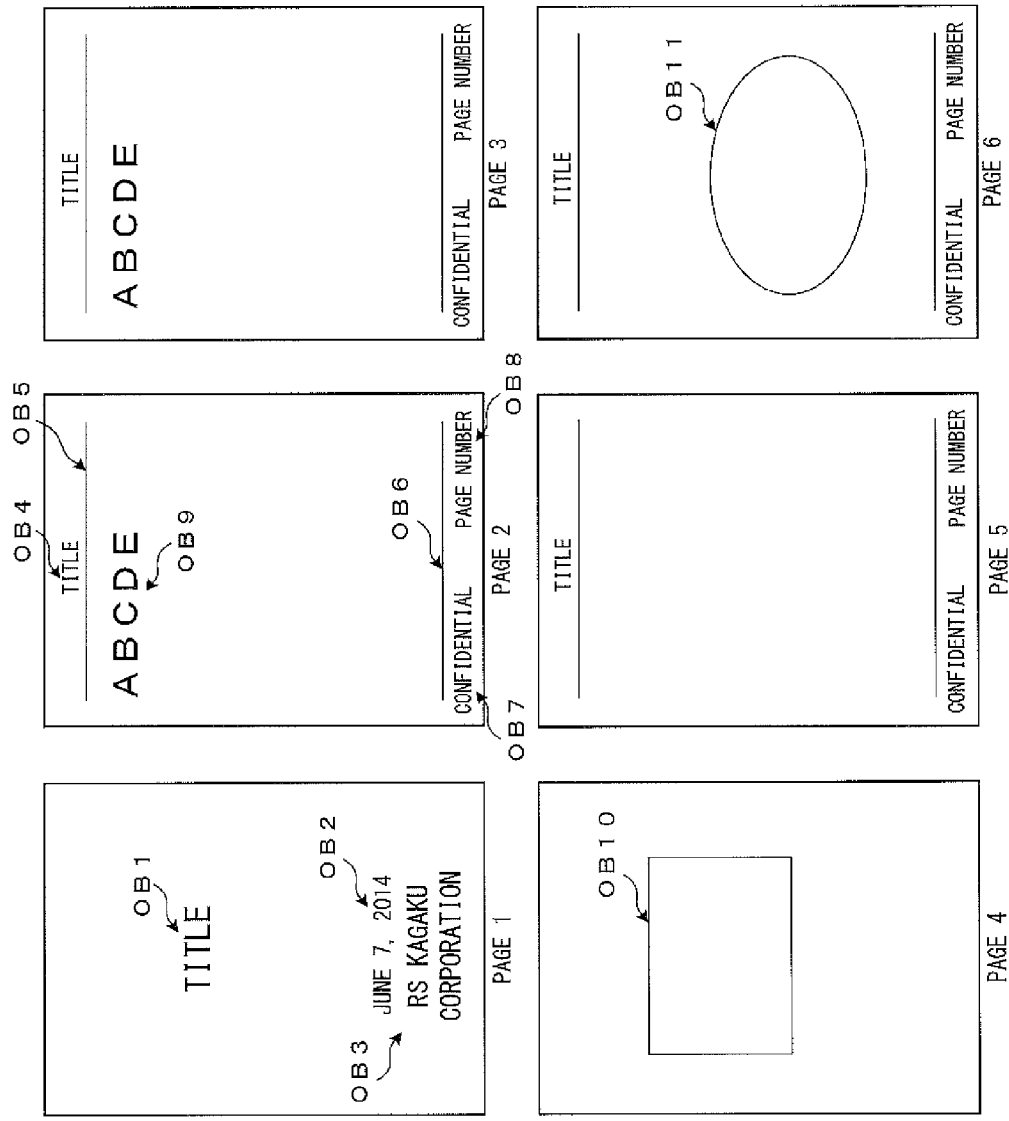
FIG. 15 illustrates a concrete example of document data that is a processing target in accordance with embodiment 3.

With reference to FIGS. 13-16C, the following will describe the blank sheet determination process in accordance with embodiment 3 by focusing on the blank redetermination process under the concrete example of FIG. 15. FIG. 15 illustrates a concrete example of document data that is a processing target in accordance with embodiment 3. FIGS. 16A, 16B, and 16C each illustrate the state of the page management table T1 at a point in processing time, the state corresponding to the concrete example in FIG. 15.

Assume that FIG. 16A depicts the state of the page management table T1 as of a point in time when the determining unit 17a determines in step S015 of the blank sheet determination process that a unprocessed page is not present.

In this case, the table managing unit 17c resets the flags of entries in the page management table T1 corresponding to pages 3 and 5, for which a blank flag has been set (step S502). That is, in this example, pages 3 and 5 are subject to the blank redetermination process, and FIG. 16B detects a state achieved after the flags of entries corresponding to pages 3 and 5 are reset.

In the processing of page 3, the blank sheet redetermining unit 17g identifies the exclusion information corresponding to page 6 as the initial exclusion information such that the product set of rendering instructions for a page following processing-target page 3 and for the immediately preceding page is not an empty set (step S601). As depicted in FIG. 15, the exclusion information corresponding to page 6 is information indicating objects OB4-OB8. The table managing unit 17c sets "1" as a flag value of "processing-target flag" corresponding to processing-target page 3 (step S402). In view of the fact that exclusion information has been identified (step S602: YES), the blank sheet redetermining unit 17g identifies object OB9 as a body object according to the identified exclusion information (steps S403 and S404: YES), as depicted in FIG. 15. In this example, when the color of object OB9 is different from a sheet color (step S408: YES), the blank sheet redetermining unit 17g does not determine that page 3 is blank, and hence, as depicted in FIG. 16C, the flag value of "blank flag" corresponding to page 3 in the page management table T1 remains "0".

In the processing of page 5, the blank sheet redetermining unit 17g identifies the exclusion information corresponding to page 6 as the initial exclusion information such that the product set of rendering instructions for a page following processing-target page 5 and for the immediately preceding page is not an empty set (step S601). As depicted in FIG. 15, the exclusion information corresponding to page 6 is information indicating objects OB4-OB8. The table managing unit 17c sets "1" as a flag value of "processing-target flag" corresponding to processing-target page 5 (step S402). In view of the fact that exclusion information has been identified (step S602: YES), the blank sheet redetermining unit 17g identifies a body object according to the identified exclusion information (step S403). In view of the fact that, as depicted in FIG. 15, page 5 includes objects OB4-OB8, the blank sheet redetermining unit 17g determines that a body object has not been identified (step S404: NO). That is, the blank sheet redetermining unit 17g determines that page 5 is a blank page. As depicted in FIG. 16C, the table managing unit 17c sets "1" as a flag value of "blank flag" in the page management table T1 corresponding to page 5 (step S405).

FIG. 16C depicts the state of the page management table T1 as of a point in time at which the determining unit 17a determines in step S409 of the blank redetermination process that all of the pages have been processed. That is, FIG. 16C indicates that page 3, which was judged to be blank in the blank sheet determination process performed by the blank sheet determining unit 17e, is judged to not be blank in the blank redetermination process. In fact, as depicted in FIG. 15, page 3 includes object OB9, which does not belong to a form, and, as described above, the color of object OB9 is different from the sheet color, indicating that the determination made in the blank redetermination process is correct.

In embodiment 3, according to another piece of exclusion information such that a product set is not an empty set, the printing apparatus 10 makes the blank sheet determination again for a page judged to be blank. Such a configuration can improve the accuracy of the blank sheet determination, thereby preventing a nonblank page from being processed as a blank page.

<Embodiment 4>

In embodiment 4, a product set of rendering instructions for as many pages as a predetermined page count (hereinafter referred to as a predetermined page set) is calculated, and exclusion information in embodiment 4 is information indicating an object corresponding to a rendering instruction belonging to the calculated product set. A body object is identified from a page belonging to a processing-target predetermined page set according to the exclusion information identified in such a way.

The configuration is applicable to any of embodiments 1-3. The following descriptions are based on a situation in which the configuration is applied to embodiment 1.

The basic configuration of the printing apparatus 10 in accordance with embodiment 4 is identical with that of the printing apparatus 10 in accordance with embodiment 1. However, the functions achieved by the determining unit 17a, the table managing unit 17c, and the identifying process unit 17d are slightly different from those achieved in embodiment 1.

The determining unit 17a further determines whether all of the pages included in a predetermined page set that is a processing target have been processed. When, for example, the processing-target predetermined page set is pages 1-3, the determining unit 17a determines whether pages 1-3 have been processed.

The table managing unit 17c manages the page management table T1. More particularly, upon receipt of a print job, the table managing unit 17c initializes the page management table T1. The table managing unit 17c analyzes the received print job and registers as many entries as the number of pages of processing-target document data. The table managing unit 17c sets a flag value of "processing-target flag" corresponding to the processing-target page to "1". When the blank sheet determining unit 17e judges the processing-target page to be blank, the table managing unit 17c sets "1" as a flag value of "blank flag" corresponding to the page judged to be blank.

According to a rendering instruction for each object included on pages, the identifying process unit 17d performs a process of identifying exclusion information for the processing-target page. The exclusion information indicates an object excluded from the target of the blank sheet determination; as described above, the exclusion information in embodiment 4 indicates an object corresponding to a rendering instruction included in the product set of rendering instructions for all pages belonging to the predetermined page set. When the predetermined page set is, for example, three pages, the identifying process unit 17d calculates the product set of rendering instructions for the three pages and identifies, as exclusion information, information indicating an object corresponding to a rendering instruction included in the calculated product set.

More particularly, the identifying process unit 17d searches fields of "processing-target flag" in the page management table T1 so as to identify pages corresponding to the predetermined page set from among unprocessed pages in ascending order of page number. The identifying process unit 17d analyzes the received print job and obtains rendering information for each identified unprocessed page. The identifying process unit 17d identifies exclusion information by calculating the product set of rendering instructions for the predetermined page set. In this case, for an initial predetermined page set, i.e., a predetermined page set that includes an initial page (page 1), the identifying process unit 17d initializes the exclusion-information storage unit 12a.

When the calculated product set is not an empty set and exclusion information is stored in the exclusion-information storage unit 12a, the identifying process unit 17d compares the identified exclusion information with the stored exclusion information. When the identified exclusion information is different from the stored exclusion information, the identifying process unit 17d updates the exclusion information stored in the exclusion-information storage unit 12a with the identified exclusion information. When the calculated product set is not an empty set and exclusion information is not stored in the exclusion-information storage unit 12a, the identifying process unit 17d stores the identified exclusion information in the exclusion-information storage unit 12a.

Figure 17:
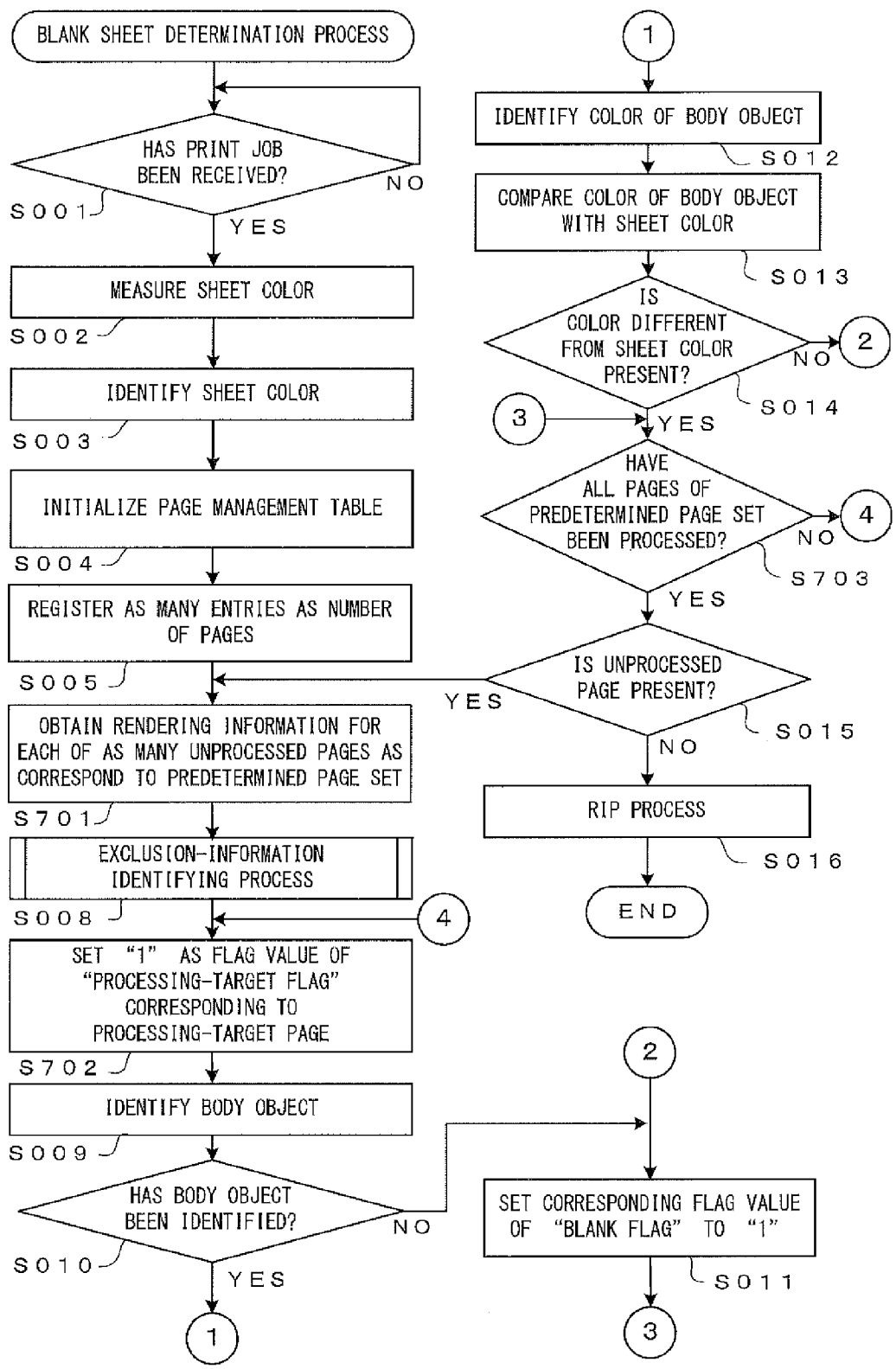
FIG. 17 is an exemplary flowchart illustrating the flow of a blank sheet determination process in accordance with embodiment 4.

With reference to FIG. 17, the following will describe the flow of a blank sheet determination process in accordance with embodiment 4. FIG. 17 is an exemplary flowchart illustrating the flow of the blank sheet determination process in accordance with embodiment 4. Reception of a print job triggers the blank sheet determination process.

Like processes are given like reference marks to those used in embodiment 1. The following will mainly describe different processes.

The table managing unit 17c initializes the page management table T1 (step S004) and registers as many entries as the number of pages of processing-target document data in the page management table T1 (step S005). The identifying process unit 17d refers to the page management table T1 so as to identify as many unprocessed pages as correspond to a predetermined page set, and obtains rendering information for each of the identified unprocessed pages (step S701).

The identifying process unit 17d performs the exclusion-information identifying process (step S008). The table managing unit 17c sets as a flag value of "processing-target flag" corresponding to each processing-target page (step S702).

The blank sheet determining unit 17e identifies a body object within the processing-target page according to exclusion information stored in the exclusion-information storage unit 12a (step S009). When exclusion information is not stored in the exclusion-information storage unit 12a, the blank sheet determining unit 17e identifies, as a body object, an object obtained by excluding a null character from the objects included in the processing-target page.

The blank sheet determining unit 17e determines whether a body object has been identified (step S010). When the blank sheet determining unit 17e determines that a body object has not been identified (step S010: NO), i.e., when the processing-target page is judged to be blank, the table managing unit 17c sets "1" as a corresponding flag value of "blank flag" in the page management table T1 (step S011). Then, the flow shifts to step S703, which will be described hereinafter.

When the blank sheet determining unit 17e determines that a body object has been identified (step S010: YES), the flow shifts to step S012, described above with reference to embodiment 1.

When the blank sheet determining unit 17e determines in step S014 that a body object whose color is different from a sheet color is present (step S014: YES), the determining unit 17a determines whether all of the pages of the predetermined page set have been processed (step S703). When the determining unit 17a determines that not all of the pages of the predetermined page set have been processed (step S703: NO), the flow returns to step S702, and the processes described above are repeated.

When the determining unit 17a determines that all of the pages of the predetermined page set have been processed (step S703: YES), the determining unit 17a further determines whether an unprocessed page is present (step S015). When the determining unit 17a determines that an unprocessed page is present (step S015: YES), the flow returns to step S701, and the processes described above are repeated.

When the determining unit 17a determines that an unprocessed page is not present (step S015: NO), the flow shifts to step S016, described above with reference to embodiment 1.

Figure 18:
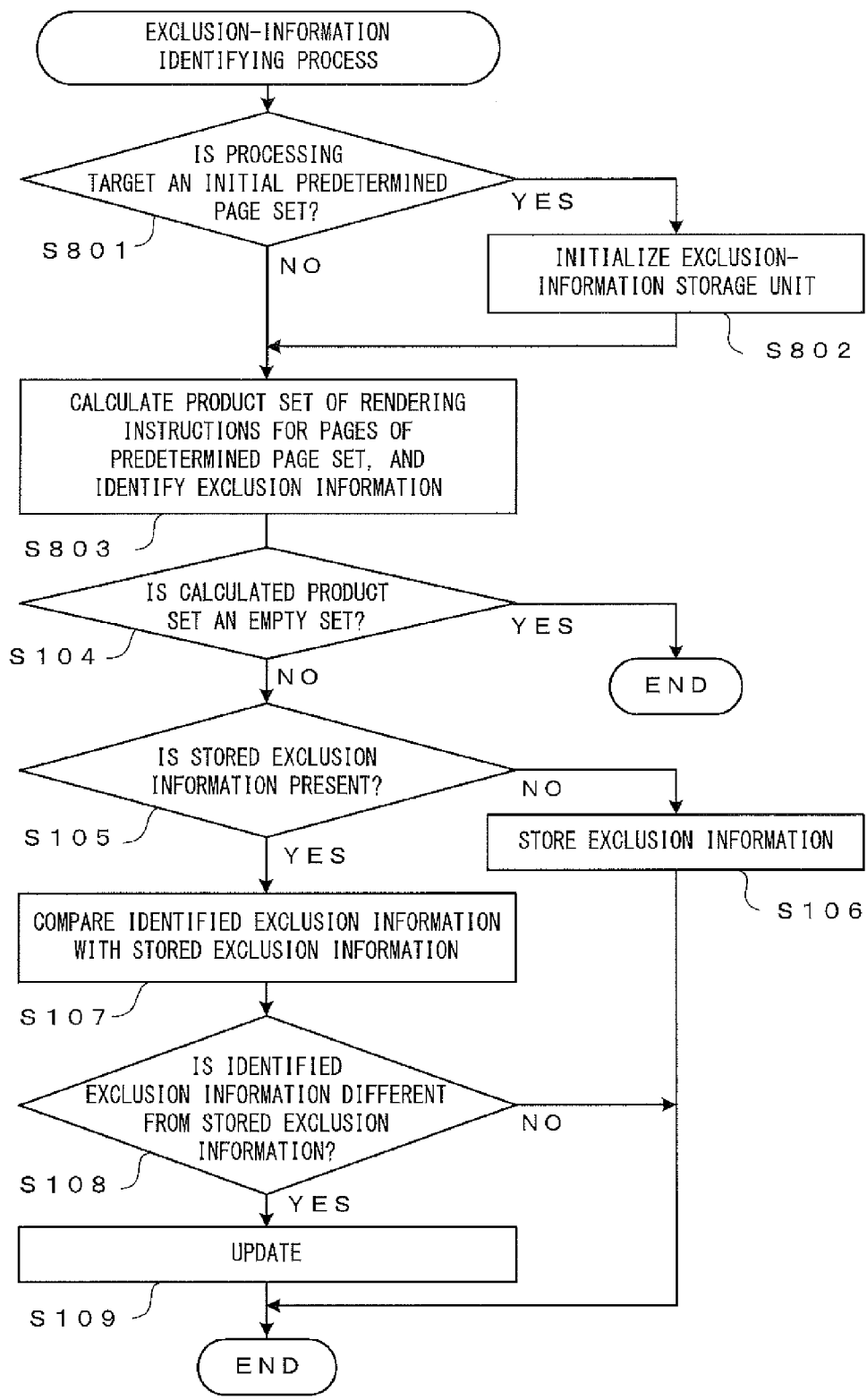
FIG. 18 is an exemplary flowchart illustrating the flow of an exclusion-information identifying process in accordance with embodiment 4.

With reference to FIG. 18, the following will describe the flow of an exclusion-information identifying process in accordance with embodiment 4. FIG. 18 is an exemplary flowchart illustrating the flow of the exclusion-information identifying process in accordance with embodiment 4. The exclusion-information identifying process corresponds to step S008 of the blank sheet determination process.

Like processes are given like reference marks to those used in embodiment 1. The following will mainly describe different processes.

The identifying process unit 17d determines whether a processing target is an initial predetermined page set (step S801). When the identifying process unit 17d determines that the processing target is an initial predetermined set (step S801: YES), the identifying process unit 17d initializes the exclusion-information storage unit 12a (step S802). Then, the flow shifts to step S803, which will be described hereinafter.

When the identifying process unit 17d determines that the processing target is not an initial predetermined page set (step S801: NO), the identifying process unit 17d calculates the product set of rendering instructions for the pages of the predetermined page set and identifies exclusion information (step S803). Then, the flow shifts to step S104, described above with reference to embodiment 1.

<Embodiment 5>

In embodiment 5, when a print-target page includes an object (rendering instruction) corresponding to a page number and some pages are judged to be blank and thus are not to be printed, it is confirmed with the user whether to make a correction to make the page numbers consecutive, and the page numbers are corrected in accordance with the user's instruction.

The configuration is applicable to any of embodiments 1-4. The following descriptions are based on a situation in which the configuration is applied to embodiment 1.

Figure 19:
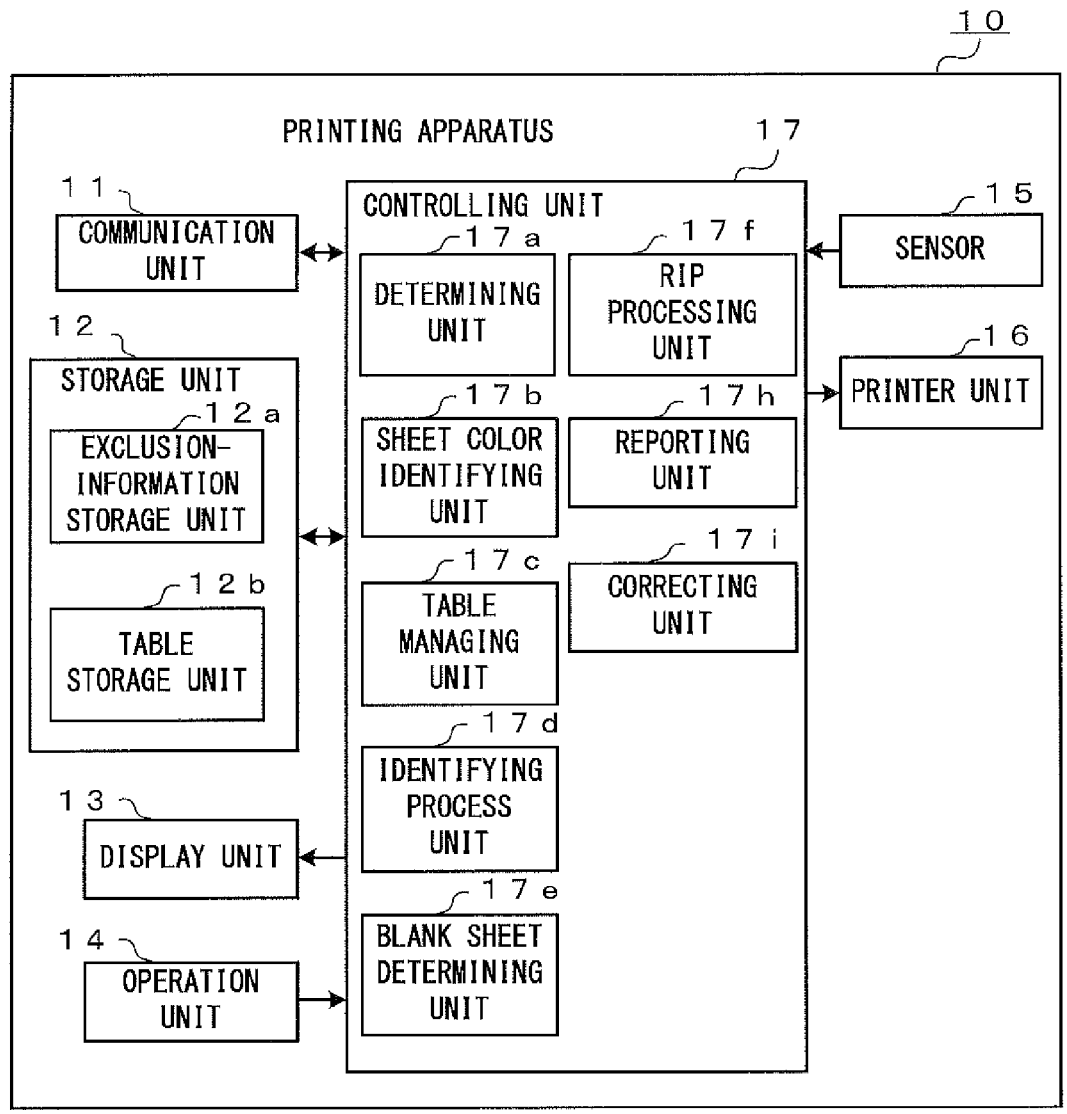
FIG. 19 is a functional block diagram illustrating an exemplary configuration of a printing apparatus that constitutes a printing system in accordance with embodiment 5.

FIG. 19 is a functional block diagram illustrating an exemplary configuration of a printing apparatus 10 that constitutes a printing system 100 in accordance with embodiment 5. The basic configuration of the printing apparatus 10 in accordance with embodiment 5 is identical with that of the printing apparatus 10 in accordance with embodiment 1. However, embodiment 5 is different from embodiment 1 in the sense that the controlling unit 17 further includes a reporting unit 17h and a correcting unit 17i, as depicted in FIG. 19. The function achieved by the determining unit 17a is slightly different from that achieved in embodiment 1.

The controlling unit 17 consists of, for example, a CPU and executes an operation program stored in a program area of the storage unit 12. This allows the controlling unit 17 to function as the determining unit 17a, the sheet color identifying unit 17b, the table managing unit 17c, the identifying process unit 17d, the blank sheet determining unit 17e, the RIP processing unit 17f, the reporting unit 17h, and the correcting unit 17i, as depicted in FIG. 19. In addition, the controlling unit 17 performs processes such as a controlling process for controlling the entirety of the printing apparatus 10 and a blank sheet determination process that will be described hereinafter in detail.

In addition, the determining unit 17a refers to the page management table T1 so as to determine whether a blank flag has been set. When the determining unit 17a determines that a blank flag has been set, the determining unit 17a further determines according to rendering information of pages whether a print-target page includes a rendering instruction for a page number.

The determining unit 17a also determines whether the user has chosen to correct a page number. For example, a check screen (not illustrated) may be displayed on the display of an information terminal apparatus 20 that has received a check report, and, when the user chooses to make a correction in accordance with the check screen, the determining unit 17a may determine that the user has chosen to correct a page number.

The reporting unit 17h generates a check report for checking with the user whether to make a correction to make page numbers consecutive. The reporting unit 17h transmits the generated check report via the communication unit 11 to an information terminal apparatus 20 that is a source of a processing-target print job.

When the user chooses to correct the page numbers, the correcting unit 17i makes a correction to make the page numbers consecutive. The page numbers are corrected in accordance with the user's instruction in such a way because, for example, correcting page numbers disrupts the correlation with a table of contents, if any, and thus causes a disadvantage against the user's intentions.

Figure 20:
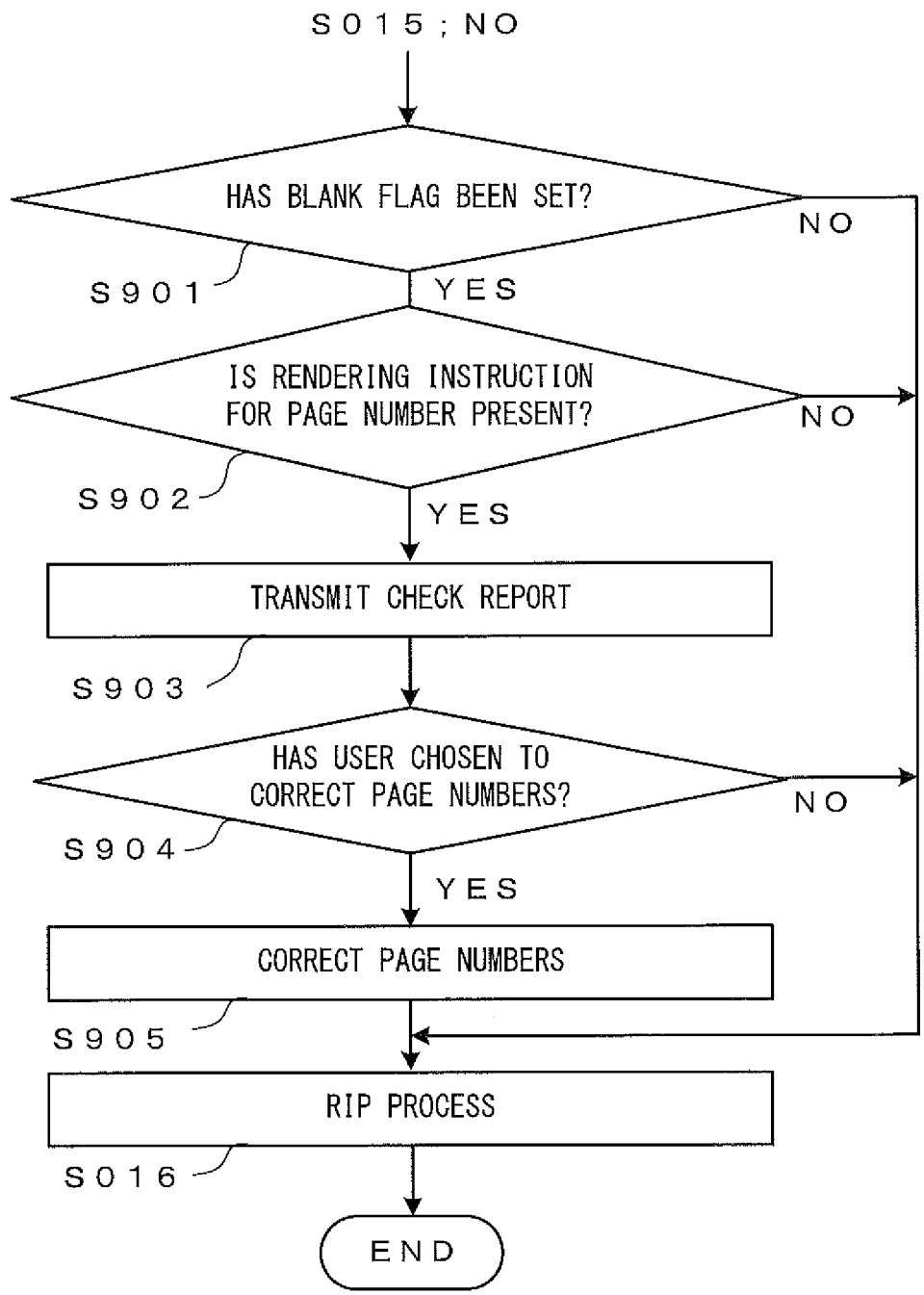
FIG. 20 is a portion of an exemplary flowchart illustrating the flow of a blank sheet determination process in accordance with embodiment 5.

With reference to FIG. 20, the following will describe the flow of a blank sheet determination process in accordance with embodiment 5. FIG. 20 is a portion of an exemplary flowchart illustrating the flow of the blank sheet determination process in accordance with embodiment 5.

When the determining unit 17a determines in the process of step S015 that an unprocessed page is not present (step S015: NO), the determining unit 17a further refers to the page management table T1 so as to determine whether a blank flag has been set (step S901). When the determining unit 17a determines that a blank flag has not been set (step S901: NO), the flow shifts to step S016, described above with reference to embodiment 1.

When the determining unit 17a determines that a blank flag has been set (step S901: YES), the determining unit 17a further determines whether a processing-target page includes a rendering instruction for a page number (step S902). When the determining unit 17a determines that a rendering instruction for a page number is not included (step S902: NO), the flow shifts to step S016, described above with reference to embodiment 1.

When the determining unit 17a determines that a rendering instruction for a page number is included (step S902: YES), the reporting unit 17h generates and transmits a check report to the information terminal apparatus 20 that is the source of a processing-target print job (step S903).

The determining unit 17a determines whether the user has chosen to correct page numbers (step S904). When the determining unit 17a determines that the user has not chosen to correct page numbers (step S904: NO), the flow shifts to step S016, described above with reference to embodiment 1.

When the determining unit 17a determines that the user has chosen to correct page numbers (step S904: YES), the correcting unit 17i makes a correction to make the page numbers consecutive (step S905). The RIP processing unit 17f refers to the page management table T1 so as to generate raster data by performing a RIP process on pages other than the pages judged to be blank (step S016). Then, the flow ends.

In embodiment 5, when a page includes an object corresponding to a page number and a page is present that is to be excluded in the generating of raster data, the printing apparatus 10 makes a correction to make page numbers consecutive in accordance with the user's instructions. Such a configuration can improve convenience. In addition, the appearance of printed materials can be improved.

Embodiments 1-5 were described above under a condition in which the printing apparatus 10 performs processes, e.g., the blank sheet determination process, but the embodiments are not limited to this. In a configuration, the information terminal apparatus 20 may perform such processes, and a print job for which a page judged to be blank has been excluded may be generated and output to the printing apparatus 10. In another configuration, the printer unit 16 may perform such processes.

The embodiments were described above under a condition in which the RIP process is performed after the blank sheet determination is made for all pages, but the embodiments are not limited to this. In a configuration, the RIP process may be performed sequentially on pages judged to be not blank, starting from the first page to have undergone the blank sheet determination.

Embodiments 1-3 were described above under a condition in which the product set of rendering instructions for a processing-target page and for the immediately preceding page is calculated in the identifying of exclusion information, but the embodiments are not limited to this. The product set for a processing-target page and an arbitrary page may be calculated. In a configuration, the product set for a processing-target page and a page designated by the user may be calculated.

Embodiments 1-5 were described above under a condition in which a sheet color is identified according to a measurement result provided by the sensor 15, but the embodiments are not limited to this. In a configuration, for example, the user may identify the sheet color of a print sheet to be used for printing from a list of sheet colors. In a case where the same print sheet is always used, the sheet color of the print sheet may be registered.

In embodiments 1-5, the blank sheet determination is not necessarily performed on all objects included in a page but may be performed, for example, on only objects within a predetermined region (e.g., a body region between header and footer regions). In a configuration, the user may designate the predetermined region. Such a configuration may enhance the speed of processing.

An operation program for performing the operations described above may be stored in a computer-readable recording medium such as a flexible disk, a CD-ROM (Compact Disk-Read Only Memory), a DVD (Digital Versatile Disk), or an MO (Magneto Optical disk), and may be distributed and installed on a computer of the printing apparatus 10 or the information terminal apparatus 20 in order to perform the processes described above. Moreover, the program may be stored in a disk apparatus or the like of a server apparatus on the Internet and may be, for example, superimposed onto carrier waves and downloaded into a computer.

In addition, the present invention is not limited to the above-described embodiments as they are, but may be embodied by deforming constituents within a scope not deviating from the gist of the invention at an execution step. In addition, various inventions can be made by appropriately combining a plurality of constituents that have been disclosed in the above embodiments. For example, all the constituents that have been disclosed in the embodiments may be appropriately combined. Further, constituents in different embodiments may be appropriately combined. It should be understood that various modifications and applications can be made without departing from the scope and the spirit of the invention.

EXPLANATIONS OF LETTERS OF NUMERALS

100 Printing system
10 Printing apparatus
11 Communication unit
12 Storage unit
   12a Exclusion-information storage unit
   12b Table storage unit
13 Display unit
14 Operation unit
15 Sensor
16 Printer unit
17 Controlling unit
   17a Determining unit
   17b Sheet color identifying unit
   17c Table managing unit
   17d Identifying process unit
   17e Blank sheet determining unit
   17f RIP processing unit
   17g Blank sheet redetermining unit
   17h Reporting unit
   17i Correcting unit
20 Information terminal apparatus
NW Network
   T1 Page management table
   T2 Exclusion-information management table

What is claimed is:

1. An image processing apparatus that processes a processing-target document on a page-by-page basis, the image processing apparatus comprising:
   a calculating unit that calculates a product set of rendering instructions for objects included in a processing-target page and rendering instructions for objects included in a page different from the processing-target page;
   an identifying unit that identifies a body object, the body object being obtained by excluding the objects corresponding to the rendering instructions included in the product set from objects included in the processing-target page;
a determining unit that determines whether the body object has been identified; and
a processing unit that generates raster data after excluding a page for which a determination has been made that the body object has not been identified,
wherein when the product set calculated in processing of the processing-target page is an empty set, the identifying unit identifies the body object according to a product set calculated in processing of another page that is not an empty set.

2. The image processing apparatus according to claim further comprising:
a redetermining unit that redetermines whether to exclude a predetermined page,
wherein the processing unit generates the raster data in accordance with a determination result provided by the redetermining unit.

3. The image processing apparatus according to claim 1 further comprising:
a correcting unit that, when pages include objects corresponding to page numbers and a page is present that is to be excluded in generating the raster data, makes a correction to make the page numbers consecutive in accordance with an instruction from a user.

4. An image processing apparatus that processes a processing-target document on a page-by-page basis, the image processing apparatus comprising:
a calculating unit that calculates a product set of rendering instructions for objects included in a processing-target page and rendering instructions for objects included in a page different from the processing-target page;
an identifying unit that identifies a body object, the body object being obtained by excluding the objects corresponding to the rendering instructions included in the product set from objects included in the processing-target page;
a determining unit that determines whether the body object has been identified;
a processing unit that generates raster data after excluding a page for which a determination has been made that the body object has not been identified;
a sheet color identifying unit that identifies a sheet color that is a color of a sheet to be used in printing the document; and
a body object color identifying unit that identifies a body object color that is a color of the body object identified by the identifying unit,
wherein the processing unit generates the raster data after further excluding a page that includes body object colors that are all identical with the sheet color.

5. The image processing apparatus according to claim 4, further comprising:
a redetermining unit that redetermines whether to exclude a predetermined page,
wherein the processing unit generates the raster data in accordance with a determination result provided by the redetermining unit.

6. The image processing apparatus according to claim 4, further comprising:
a correcting unit that, when pages include objects corresponding to page numbers and a page is present that is to be excluded in generating the raster data, makes a correction to make the page numbers consecutive in accordance with an instruction from a user.

* * * * *

UNITED STATES PATENT AND TRADEMARK OFFICE
CERTIFICATE OF CORRECTION

PATENT NO. : 9,489,160 B2
APPLICATION NO. : 14/743630
DATED : November 8, 2016
INVENTOR(S) : Masaki Ozawa It is certified that error appears in the above-identified patent and that said Letters Patent is hereby corrected as shown below:

In the Claims

Column 27, Line 14, Claim 2, after "claim" insert --1--.

Signed and Sealed this
Third Day of January, 2017

Michelle K. Lee
*Director of the United States Patent and Trademark Office*